United States Patent [19]
Wolberg et al.

[11] Patent Number: 5,204,944
[45] Date of Patent: Apr. 20, 1993

[54] SEPARABLE IMAGE WARPING METHODS AND SYSTEMS USING SPATIAL LOOKUP TABLES

[75] Inventors: George Wolberg, Elmhurst, N.Y.; Terrance E. Boult, Hightstown, N.J.

[73] Assignee: The Trustees of Columbia University in the City of New York, New York, N.Y.

[21] Appl. No.: 387,605

[22] Filed: Jul. 28, 1989

[51] Int. Cl.$^5$ .......................................... G06F 15/00
[52] U.S. Cl. .................... 395/127; 395/162; 395/119; 340/747; 340/728; 382/44
[58] Field of Search ........ 364/518, 521, 522, 949.4 M, 364/949.4 S; 395/133, 136, 162, 163, 164, 118, 119, 127; 340/728, 747, 750; 382/114

[56] References Cited

U.S. PATENT DOCUMENTS

| | | | |
|---|---|---|---|
| 4,472,732 | 9/1984 | Bennett et al. | 358/22 |
| 4,835,532 | 5/1989 | Fant | 340/728 |
| 4,835,737 | 5/1989 | Herrig et al. | 364/900 |
| 4,839,855 | 6/1989 | Van Driel | 364/900 |
| 4,853,888 | 8/1989 | Lata et al. | 364/900 |
| 4,860,249 | 8/1989 | Nicely et al. | 364/900 |
| 4,878,183 | 10/1989 | Ewart | 364/521 |

OTHER PUBLICATIONS

Cutmull, E. and A. R. Smith, "3-D Transformations of Images in Scanline Order," Computer Graphics, (SIGGRAPH '80 Proceedings), vol. 14, No. 3, pp. 279-285, Jul. 1980.

Dippe, M.A.Z and E. H. Wold, "Antialiasing Through Stochastic Sampling," Computer Graphics, (SIGGRAPH '85 Proceedings), vol. 19, No. 3, pp. 69-78, Jul. 1985.

Fant, K. M., "A Nonaliasing, Real-Time Spatial Transform Technique," IEEE Computer Graphics and Applications, vol. 6, No. 1, pp. 71-80, Jan. 1986.

Heckbert, P., "Survey of Texture Mapping," IEEE Computer Graphics and Applications, vol. 6, No. 11, pp. 56-57, Nov. 1986.

Mitchell, D., "Generating Antialiased Images at Low Sampling Densities," Computer Graphics, (SIGGRAPH '87 Proceedings), vol. 21, No. 4, pp. 65-72, Jul. 1987.

Paeth, A. W., "A Fast Algorithm for General Raster Rotation," Graphics Interface '86, pp. 77-81, May 1986.

Smith, A. R., "Planar 2-Pass Texture Mapping and Warping," Computer Graphics, (SIGGRAPH '87 Proceedings), vol. 21, No. 4, pp. 263-272, Jul. 1987.

Tanaka, A., M. Kameyama, and O. Watanabe, "A Rotation Method for Raster Image Using Skew Transformation," Proc. IEEE Conference on Computer Vision and Pattern Recognition, pp. 272-277, Jun. 1986.

Weiman, C. F. R., "Continuous Anti-Aliased Rotation and Zoom of Raster Images," Computer Graphics, (SIGGRAPH '80 Proceedings), vol. 14, No. 3, pp. 286-293, Jul. 1980.

*Primary Examiner*—Gary V. Harkcom
*Assistant Examiner*—Phu K. Nguyen
*Attorney, Agent, or Firm*—Brumbaugh, Graves, Donohue & Raymond

[57] ABSTRACT

A two-dimensional image is subjected to a three-dimensional effect, such as folding, twisting or rotation, and transformed or warped into a modified output image. By successive one-dimensional resampling along two coordinates and parallel channel processing of transposed input image data with rejection of distorted pixel value data, bottleneck, shear and other distortions are addressed. Complete warping systems, resampling subsystems and related methods are disclosed.

38 Claims, 22 Drawing Sheets

INPUT ARRAY    OUTPUT (ACCUMULATOR) ARRAY $$I_x[0] = (100)((.4)) = 40$$
$$I_x[1] = \left[(100)\left[1-\frac{.4}{1.7}\right] + (106)\left[\frac{.4}{1.7}\right]\right]((1)) = 101$$
$$I_x[2] = \left[(100)\left[1-\frac{1.4}{1.7}\right] + (106)\left[\frac{1.4}{1.7}\right]\right]((.3)) + (106)((.7)) = 106$$
$$I_x[3] = \left[106\left[1-\frac{.7}{.9}\right] + (92)\left[\frac{.7}{.9}\right]\right]((.2)) + (92)((.1)) + (90)((.6)) = 82$$
FIG. 7
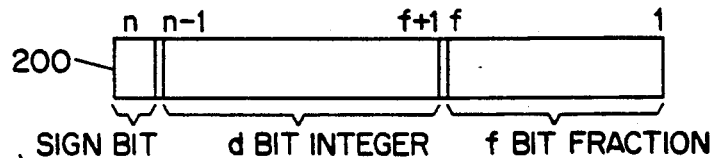
n BIT FIXED POINT NUMBER IN SIGNED MAGNITUDE REPRESENTATION
∅ = ALL ZEROS
FIG. 8a
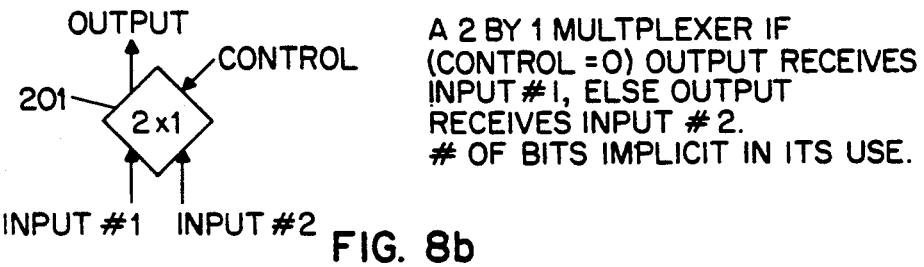
FIG. 8b
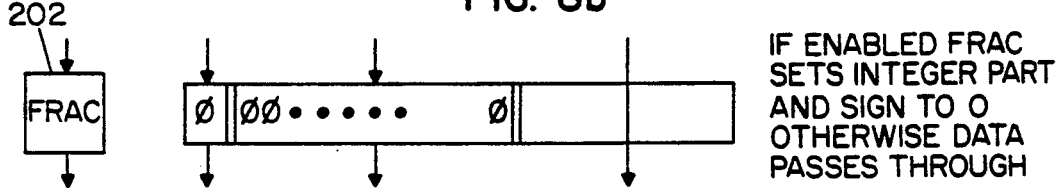
FIG. 8c
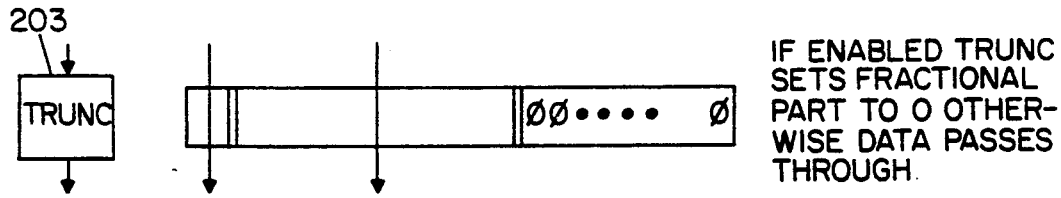
FIG. 8d
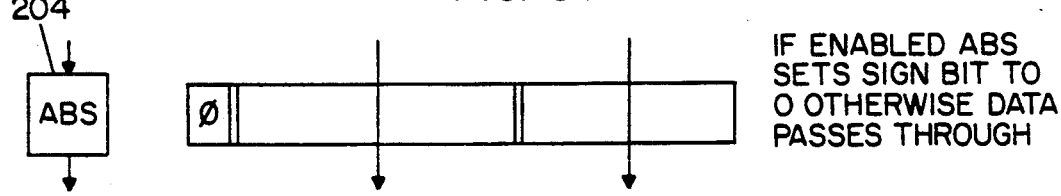
FIG. 8e $$YLUT_x[0] = (100)\left[1-\frac{0}{1.7}\right]+(106)\left[\frac{0}{1.7}\right] = 101$$
$$YLUT_x[1] = (100)\left[1-\frac{4}{1.7}\right]+(106)\left[\frac{4}{1.7}\right] = 101$$
$$YLUT_x[2] = (100)\left[1-\frac{1.4}{1.7}\right]+(106)\left[\frac{1.4}{1.7}\right] = 105$$
$$YLUT[3] = (106)\left[1-\frac{.7}{.9}\right]+(115)\left[\frac{.7}{.9}\right] = 113$$
FIG. 10
FIG. 11
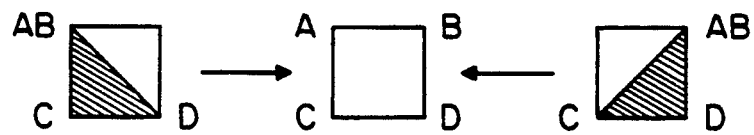
FIG. 12
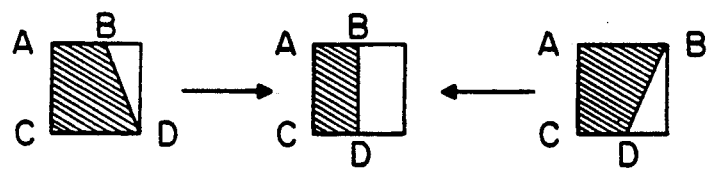
FIG. 13

FOLDOVER POINTERS

FOLDOVER LAYERS

MULTISPAN

SCANSTRUCT

ACCUM

SEPARABLE IMAGE WARPING METHODS AND SYSTEMS USING SPATIAL LOOKUP TABLES

BACKGROUND OF THE INVENTION

1. Field of the Invention

The invention relates generally to electronic transformation of an image into a modified image which has undergone expansion, contraction, folding, rippling, curling, twisting or other modification or distortion, or a combination thereof. Typically, a two-dimensional image may be subjected to a three-dimensional effect, such as being folded over upon itself, and then displayed as a modified two-dimensional image. As will be apparent, in presenting a folded image, provision must be made for deleting the portions falling in back of other sections of the image. Folding and other effects result in image transformation problems which have been complex, expensive or impossible to provide for on a practical basis in the prior art.

Image warping is a geometric transformation that redefines the spatial relationship between points in an image. This area has received considerable attention due to its practical importance in remote sensing, medical imaging, computer vision, and computer graphics. Typical applications include distortion compensation of imaging sensors, decalibration for image registration, geometrical normalization for image analysis and display, map projection, and texture mapping for image synthesis.

2. Description of the Prior Art

Image warping has benefited dramatically from developments in separable geometric transformation algorithms. Also known as scanline algorithms, these methods reduce a two-dimensional ("2-D") resampling problem into a sequence of one-dimensional ("1-D") scanline resampling operations. This makes them amenable to streamline processing and allows them to be implemented with conventional hardware. Scanline algorithms have been shown to apply over a wide range of transformations, including perspective projection of rectangles, bivariate patches, and superquadrics. Hardware products such as the Quantel Mirage system, the Ampex system as described in U.S. Pat. Nos. 4,463,372, 4,468,688 and 4,472,732, and the Honeywell system as described in U.S. Pat. No. 4,835,532, are based on these techniques in order to produce real-time video effects for television and other applications.

Early ideas on scanline algorithms are presented in a paper by Catmull and Smith, "3-D Transformations of Images in Scanline Order", *Computer Graphics* (SIGGRAPH '80 Proceedings), vol. 14, no. 3, pp. 279-285, July 1980. It describes a two-pass technique that decomposes the 2-D resampling problem into two orthogonal 1-D resampling stages. This is the basis for much of the other separable work. Nevertheless, the approach suffers from problems known as "bottleneck" and "foldover"—difficulties which can result in visual artifacts and costly memory requirements.

BACKGROUND DISCUSSION

Separable geometric transformation algorithms, also known as scanline algorithms, spatially transform 2-D images by decomposing the mapping into a sequence of orthogonal 1-D transformations. This implies that the mapping function is separable, i.e., each dimension can be resampled independently of the other. For instance, two-pass scanline algorithms typically apply the first pass to the image rows and the second pass to the columns. Although classic scanline algorithms cannot handle all possible mapping functions, they can be shown to work particularly well for an interesting class of transformations.

The primary motivation for scanline algorithms is efficiency. Traditionally, geometric transformations have been formulated as either forward or inverse mappings operating entirely in 2-D. While either forward or inverse mappings can be used to realize arbitrary mapping functions, they are costly. Separable algorithms present an alternate technique that, for a small decrease in accuracy, yields significant computational savings.

A "spatial transformation" defines a geometric relationship between each point in the input and output images. The general mapping function can be given in two forms: either relating the output coordinate system to that of the input, or vice versa. Respectively, they can be expressed as $$[x,y] = [X(u,v), Y(u,v)], \qquad (1)$$

or $$[u,v] = [U(x,y), V(x,y)] \qquad (2)$$

where [u,v] refers to the input image coordinates corresponding to output pixel [x,y], and X, Y, U, and V are mapping functions that uniquely specify the spatial transformation. Since X and Y map or transform input to output, they are referred to as the forward maps or transformations. Similarly, the U and V functions are known as the inverse mapping or transformation since they map or transform the output to the input.

Forward Mapping

The forward mapping consists of interpolating each input pixel into the output image at positions determined by the X and Y mapping functions. Each input pixel is passed through the spatial transformation where it is assigned new output coordinate values. Since this is a mapping from pairs of integers to pairs of reals, filtering is required to generate the output image.

The real-valued output positions assigned by X and Y present complications. For discrete images, pixels are taken to be finite elements defined to lie on a (discrete) integer lattice. Implementing the spatial transformation as a point-to-point mapping can give rise to two types of problems: holes and overlaps. Holes, or patches of undefined pixels, occur when mapping contiguous input samples to sparse positions on the output grid. In contrast, overlaps occur when consecutive input samples collapse into one output pixel.

The shortcomings of point-to-point mappings are avoided using a four-corner mapping paradigm. This considers input pixels as square patches assumed to be transformed into quadrilaterals in the output image. Because the projection of an input pixel is free to lie anywhere in the output image, the projections often straddle several output pixels, or lie embedded in one. These two instances are illustrated in FIG. 1. A two-dimensional accumulator array is required to properly integrate all input pixel fragments that contribute to each output pixel. Partial contributions are handled by scaling the input intensity by the relative area of the output pixel that it covers. Thus each position in the accumulator array evaluates $$\sum_{i=0}^{N} w_i f_i$$

where $f_i$ is the input value, $w_i$ is the weight reflecting its coverage of the output pixel, and N is the total number of deposits into the cell. Note that N is free to vary among pixels and is determined only by the mapping function and the output discretization.

There are two main problems in the forward mapping process. First, costly intersection tests are needed to derive the area coverage. Second, additional filtering is necessary to ensure that a single input value is correctly handled when undergoing magnification. For a review of these techniques, see Heckbert, P., "Survey of Texture Mapping", *IEEE Computer Graphics and Applications*, vol. 6, no. 11, pp. 56–67, November 1986.

Inverse Mapping

The inverse mapping operates in screen order, projecting each output coordinate into the input image via U and V. The value of the data sample at that point is copied onto the output pixel. Again, filtering is necessary to combat aliasing artifacts. The principal advantages of this method are that no accumulator array is necessary and output pixels which lie outside a clipping window need not be evaluated. This method is useful when the screen is to be written sequentially, U and V are readily available, and the input image can be stored entirely in memory.

Inverse mappings are more commonly used to perform spatial transformations. By operating in scanline order at the output, square output pixels are back-projected onto arbitrary quadrilaterals in the input. The quadrilaterals, also known as preimages, may cover many input pixels. Each preimage must be sampled and convolved with a low-pass filter to compute an intensity at the output. In general, the input image is not accessed in scanline order. Efficient approaches to sampling and convolution have received much attention in the recent literature. See, for example, Dippe, M. A. Z. and E. H. Wold, "Antialiasing Through Stochastic Sampling", *Computer Graphics* (SIGGRAPH '85 Proceedings), vol. 19, no. 3, pp. 69–78, July 1985; Fant, K. M., "A Nonaliasing, Real-Time Spatial Transform Technique", *IEEE Computer Graphics and Applications*, vol. 6, no. 1, pp. 71–80, January 1986; and Mitchell, D., "Generating Antialiased Images at Low Sampling Densities", *Computer Graphics* (SIGGRAPH '87 Proceedings), vol. 21, no. 4, pp. 65–72, July 1987.

Separable Mapping

Separable mapping decomposes the forward mapping function into a series of 1-D transforms. This offers several advantages. First, the resampling problem is made simpler since reconstruction, area sampling, and filtering can now be done entirely in 1-D. Second, efficient data access and substantial savings in input and output time can be realized because the input image can be read in row-column order and the output image produced in scanline order. Third, the approach is amenable to stream-processing techniques such as pipelining, and facilitates the design of hardware to operate at real-time video rates.

It is important to elaborate on use of the term separable. In signal processing literature, a filter T is said to be separable if $T(u,v) = F(u)G(v)$. This definition is extended by defining T to be separable if $T(u,v) = F(u) \circ G(v)$. This simply replaces multiplication with the composition operator in combining both 1-D functions. This definition for separability is consistent with standard implementation practices. For instance, the 2-D Fourier Transform, separable in the classic sense, is generally implemented by a two-pass algorithm. The first pass applies a 1-D Fourier Transform to each row, and the second applies a 1-D Fourier Transform along each column of the intermediate result.

Multi-pass scanline algorithms that operate in this sequential row-column manner will be referred to as separable. The underlying theme is that processing is decomposed into a series of 1-D stages that each operate along orthogonal axes. For example, image rotation has been shown to be decomposable into a two-pass scale/shear succession (Catmull and Smith paper referenced above), a four-pass scale/shear sequence (Weiman, C. F. R., "Continuous Anti-Aliased Rotation and Zoom of Raster Images", *Computer Graphics* (SIGGRAPH '80 Proceedings), vol. 14, no. 3, pp. 286–293, July 1980), and a three-pass shear transformation (Paeth, A. W., "A Fast Algorithm for General Raster Rotation", *Graphics Interface '86*, pp. 77–81, May 1986; and Tanaka, A., M. Kameyama, S. Kazama, and O. Watanabe, "A Rotation Method for Raster Image Using Skew Transformation", *Proc. IEEE Conference on Computer Vision and Pattern Recognition*, pp. 272–277, June 1986).

Catmull-Smith Algorithm

The most general presentation of the two-pass technique appears in the seminal work described by Catmull and Smith in their paper referenced above. That paper tackles the problem of mapping a 2-D image onto a 3-D surface and then projecting the result onto the 2-D screen for viewing, through the decomposition of these steps into a sequence of computationally cheaper mapping operations. In particular, it is shown that in some cases a 2-D resampling problem can be replaced with two orthogonal 1-D resampling stages.

In the first pass, each horizontal scanline (row) is resampled according to spatial transformation F(u), generating an intermediate image I in scanline order. All pixels in I have the same x coordinates that they will assume in the final output; only their y coordinates now remain to be computed. Since each scanline will generally have a different transformation, function F(u) will usually differ from row to row. Consequently, F can be considered to be a function of both u and v. Obviously, $F(u,v)$ is identical to $X(u,v)$. Rewrite $F(u,v)$ as $F_v(u)$ to denote that F is applied to horizontal scanlines, each having constant v. Therefore, the first pass is expressed as $$[x,v] = [F_v(u),v] = [X(u,v),v] \qquad (3)$$

This relation maps each [u,v] point onto I, an intermediate image in the [x,v] plane.

In the second pass, each vertical scanline (column) in I is resampled according to spatial transformation G(v), generating the final image in scanline order. The second pass is more complicated than the first pass because the expression for G is often difficult to derive. This is due to the fact that [x,v] must be inverted to get [u,v] so that G can directly access Y(u,v). In doing so, new y coordinates can be computed for each point in I.

Inverting f requires solution of the equation $X(u,v) - \bar{x} = 0$ for u to obtain $u = H_{\bar{x}}(v)$ for vertical scanline (column)$\bar{x}$. Note that $\bar{x}$ contains all the pixels along the column at x. Function H, known as the auxiliary function, represents the u-coordinates of the inverse projection of $\bar{x}$, the column we wish to resample. Thus, for every column in I, $H_x(v)$ is computed and used together with the available v coordinates to index into mapping function Y. This specifies the vertical spatial transformation necessary for resampling the column. The second pass is therefore expressed as $$[x,y] = [x, G_x(v)] \qquad (4)$$

where $G_x(v)$ refers evaluation of $G(x,v)$ along vertical scanlines with constant x. It is given by $$G_x(v) = Y(H_x(v), v) \qquad (5)$$

The relation in Eq. 4 maps all points in I from the [x,v] plane onto the [x,y]plane, defining the final image.

In summary, the two-pass algorithm has three steps. They correspond directly to the evaluation of scanline functions F and G, as well as the auxiliary function H.

(1) The horizontal scanline function is defined as $F_v(u) = X(u,v)$. Each row is resampled according to this spatial transformation, yielding intermediate image I.

(2) The auxiliary function $H_x(v)$ is derived for each vertical scanline $\bar{x}$ in I. It is defined as the solution to $\bar{x} = X(u,v)$ for u, if such a solution can be derived. Sometimes a closed form solution for H is not possible and numerical techniques such as the Newton-Raphson iteration method, as known in the prior art, must be used. As will be pointed out, computing H is a difficulty with the two-pass algorithm.

(3) Once $H_x(v)$ is determined, the second pass plugs it into the expression for Y(u,v) to evaluate the target y coordinates of all pixels in column x in image I. The vertical scanline function is defined as $G_x(v) = Y(H_x(v), v)$. Each column in I is resampled according to this spatial transformation, yielding the final image.

An Example: Rotation

The above procedure is demonstrated for the simple case of rotation. The rotation matrix is given as $$[x,y] = [u,v] \begin{bmatrix} \cos\theta & \sin\theta \\ -\sin\theta & \cos\theta \end{bmatrix} \qquad (6)$$

Every pixel in the original image is to be transformed in scanline order. By scanning a row by varying u and holding v constant, it will be immediately noticed that the transformed points are not being generated in scanline order. This presents difficulties in antialiasing filtering and fails to achieve the goals of scanline input and output.

Alternatively, the scanline may be evaluated by holding v constant in the output as well, and only evaluating the new x values. This is given as $$[x,v] = [u\cos\theta - v\sin\theta, v] \qquad (7)$$

This results in a picture that is skewed and scaled along the horizontal scanlines.

The next step is to transform this intermediate result by holding x constant and computing y. However, the equation $y = u\sin\theta + v\cos\theta$ cannot be applied since the variable u is referenced instead of the available x. Therefore, it is first necessary to express u in terms of x. Recall that $x = u\cos\theta - v\sin\theta$, so $$u = \frac{x + v\sin\theta}{\cos\theta} \qquad (8)$$

Substituting this into $y = u\sin\theta + v\cos\theta$ yields $$y = \frac{x\sin\theta + v}{\cos\theta} \qquad (9)$$

The output picture is now generated by computing the y coordinates of the pixels in the intermediate image, and resampling in vertical scanline order. This completes the two-pass rotation.

The stages derived above are directly related to the general procedure described earlier. The three expressions for F, G, and H are explicitly listed below.

(1) The first pass is defined by Eq. 7. In this case, $F_v(u) = u\cos\theta - v\sin\theta$.

(2) The auxiliary function H is given in Eq. 8. It is the result of isolating u from the expression for x in mapping function X(u,v). In this case, $H_x(v) = (x + v\sin\theta)/\cos\theta$.

(3) The second pass then plugs $H_x(v)$ into the expression for Y(u,v), yielding Eq. 9. In this case, $G_x(v) = (x\sin\theta + v)/\cos\theta$.

After completing the first pass, it is sometimes possible for the intermediate image to collapse into a narrow area. If this area is much less than that of the final image, then there is insufficient data left to accurately generate the final image. This phenomenon, referred to as the bottleneck problem, is the result of a many-to-one mapping in the first pass followed by a one-to-many mapping in the second pass. An example is the rotation of an image by 90°. Each row will collapse onto a point, resulting in an intermediate image consisting of a diagonal line. Obviously, no inverse function can resolve the intensities for the second pass.

It has been suggested that a solution to this problem lies in considering all the possible orders in which a separable algorithm can be implemented. Four variations, collectively referred to as V, are possible to generate the intermediate image:

(a) Transform u first.
(b) Transform v first.
(c) Transpose the input image and transform u first.
(d) Transpose the input image and transform v first.

In each case, the area of the intermediate image can be calculated. Prior art references suggest implementing the transformation with the variation that yields the largest intermediate area. For instance, an 87° rotation is best implemented by first rotating the image by 90° via image transposition and then applying a −3° rotation using the two-pass technique. The prior art suggests that the above heuristic has not been known to fail, however, no proof has been given.

There are three difficulties with the prior art solution to the bottleneck problem. The most critical difficulty is that the area of the intermediate image is a global measure which may fail to highlight compression variations in local areas. Although the heuristic seems to be satisfactory for specific transformations considered, it is inadequate for arbitrary mappings. For example, consider warping an image into a circular region with each row becoming a radial line, i.e., $(x,y) \rightarrow (r,\theta)$. This demonstrates a simple example in which different areas of the output map are best computed from different variations of V; no single transform from V could correctly process the entire image.

The second difficulty is that the heuristic does not properly consider aliasing artifacts. In particular, maximizing the intermediate area may require excessive compression in the second pass. In one prior art example, variations (a) and (b) above were used to map a regular grid onto a sphere. Although variation (b) maximized the area of the intermediate image, it actually caused more severe aliasing (see Smith, A. R., "Planar 2-Pass Texture Mapping and Warping," Computer Graphics, (SIGGRAPH '87 Proceedings), vol. 21, no. 4, pp. 263-272, July 1987). This non-intuitive result is due to error properties of cascading 1-D filters to approximate a 2-D filter.

The third difficulty arises when the closed-form approximation to the intermediate area does not exist. While this does not prove troublesome in simpler domains, the evaluation of the intermediate areas for complex spatial mappings requires as much or more work as computing the first passes for each variation in V.

The two-pass algorithm is particularly well-suited for mapping images onto surfaces with closed-form solutions to auxiliary function H. The process is more complicated for surfaces of higher order, e.g., bilinear, biquadratic, and bicubic patches, which may be self-occluding. This makes F or G become multi-valued at points where the image folds upon itself, an effect known as the foldover problem.

Foldover can occur in either of the two passes. A partial solution for single folds in G is to compute output pixels in back-to-front order, overwriting the hidden layers. Generating the image in this manner becomes more complicated for surfaces with more than one fold. In the general case, this becomes a hidden surface problem.

The only reasonable solution to foldover in the prior art has been to severely limit the amount of foldover, (e.g., only permit up to three folds for cubic surfaces) and to use additional framebuffers to store the folded layers. This solution is inefficient inasmuch as an entire framebuffer must be utilized even if only a small folded area is involved.

Closed-form solutions do not exist for H unless the patch has no folds. When folds occur, a solution $u = H_x(0)$ is found for the first horizontal scanline. Since surface patches are assumed to be smooth, a Newton-Raphson iteration method can be used to solve for $H_x(1)$ using the solution from $H_x(O)$ as a starting value. This exploits the spatial coherence of surface elements to solve the inverse problem at hand.

The two-pass algorithm has been shown to apply to a wide class of transformations of general interest. These mappings include the perspective projection of rectangles, bivariate patches, and superquadrics. Serial warps offer dramatic computational reductions with limited degradation. However, prior art applications have been plagued by several complications, including the bottleneck, foldover and closed-form computation problems.

SUMMARY OF THE INVENTION

It is an object of the invention to provide systems and methods permitting implementation of arbitrary image transformations enabling substantially all geometric transformations to be realized efficiently and cost effectively.

It is a further object of the invention to enable the realization of arbitrary image transformations with a separable algorithm providing solutions to bottleneck, foldover and closed-form computation problems.

It is a further object of the invention to provide apparatus and methods enabling advantages of 1-D transforms to be more fully realized.

In accordance with the invention, a separable image warping system, for transforming input image data to output image data, comprises input image value means for supplying data representing an image value for each pixel of a plurality of pixels in a two-dimensional image, x value means for supplying data representing the value of a first coordinate to which each pixel is to be transferred in an output image, y value means for supplying data representing the value of a second coordinate to which each pixel is to be transferred in output image, and z value means for supplying data representing values of a third coordinate relevant to the transformation of input image data to output image data.

The system includes a first channel, for processing input image value data to derive image values representing preliminary values of output image pixels, comprising shear resampler means coupled to x value means and y value means for processing first coordinate data for developing at a first output scaled first coordinate data representing first coordinate values of a magnification of the output image and having a plurality of pixel values in place of each pixel value of the basic output image, and for similarly processing second coordinate data for developing at a second output scaled second coordinate data having a plurality of pixel values for each pixel value of the basic output image, x intensity resampler means coupled to input image value means and to the first shear resampler output for developing intermediate pixel value data representing input image pixel values after resampling to give effect to image compression variations along the direction of the first coordinate.

The first channel also includes coordinate resampler means coupled to the first and second shear resampler outputs for developing at a first output modified second coordinate data representing scaled second coordinate values after resampling to give effect to image compression variations along the direction of the first coordinate, and for developing at a second output shear data representing a measure of compression variations along the direction of first coordinate, in the output image as compared to the input image, y intensity resampler means coupled to x intensity resampler means, first coordinate resampler output and a first z channel for developing preliminary output pixel value data representing intermediate pixel values after resampling to give effect to image compression variations along the direction of the second coordinate, and bottleneck resampler means coupled to the first and second coordinate resample outputs for developing bottleneck image value data representing shear data after resampling to give effect to image compression variations along the direction of the second coordinate.

The system has a first z channel, for processing third coordinate values, comprising terminal means for supplying scaled first coordinate data as developed at the first shear resampler output of said first channel, z shear resampler means coupled to the x value, y value and z value means for developing scaled third coordinate data representing third coordinate values of a magnification of the output image and having a plurality of pixel values in place of each pixel value of the basic output image; z coordinate resampler means coupled to the terminal means and z shear resampler means for developing modified third coordinate data representing scaled third coordinate values after resampling to give effect to image compression variations along the direction of said first coordinate, and means for coupling modified third coordinate data to the y intensity resampler of the first channel for enabling the resampler to process foldover data for deleting foldover data representative of image portions not visible in the final output image.

Transposing means coupled to the input image value, x value, y value and z value means develop transposed input image, transposed first coordinate, transposed second coordinate and transposed third coordinate data representative of the input and output images respectively after rotation of their coordinates to a second orientation.

The system also includes a second channel, for processing transposed input image value data in parallel with the first channel to similarly derive image values representing preliminary values of output image pixels of the rotated input image, comprising shear resampler means, x intensity resampler means, coordinate resampler means, y intensity resampler means and bottleneck resampler means each substantially the same as the corresponding elements of the first channel and for providing the same functions as corresponding elements, and a second z channel, in parallel with the first z channel, for similarly processing transposed third coordinate values. The second z channel indicates terminal means, z shear resampler means and z coordinate resampler means for providing the same functions as the corresponding elements of the first z channel and means for coupling the resulting modified transposed third coordinate data to the y intensity resampler of the second channel for similarly enabling that resampler.

Also included are comparator means coupled to the bottleneck resampler means of the first and second channels for comparing the respective bottleneck image value data for providing a control signal representative of which of the preliminary output pixel values, as provided at the outputs of the first and second channels, should be selected on a predetermined basis for inclusion in the final output image data for each pixel of the output image, and selector means coupled to the y intensity resamplers of the first and second channels and responsive to the control signal for providing final output image data wherein the value for each pixel represents the value for that pixel from either the first or second channel as selected in response to the control signal.

BRIEF DESCRIPTION OF THE DRAWINGS

In the drawings:

FIG. 7 illustrates equations used in computing intensity resampler values using the sample variable values provided in FIG. 6;

FIG. 8(a)–(e) is a diagram describing components used in an alternative resampling algorithm;

FIG. 10 illustrates the output pixel values for the arrays shown in FIG. 6;

FIG. 11 illustrates system representation of triangular pixel inputs;

FIG. 12 depicts a set of spatial lookup tables demonstrating horizontal shear;

FIG. 13 illustrates an image corresponding to FIG. 12 but which is antialiased;

DESCRIPTION OF A PREFERRED EMBODIMENT

Figure 1:
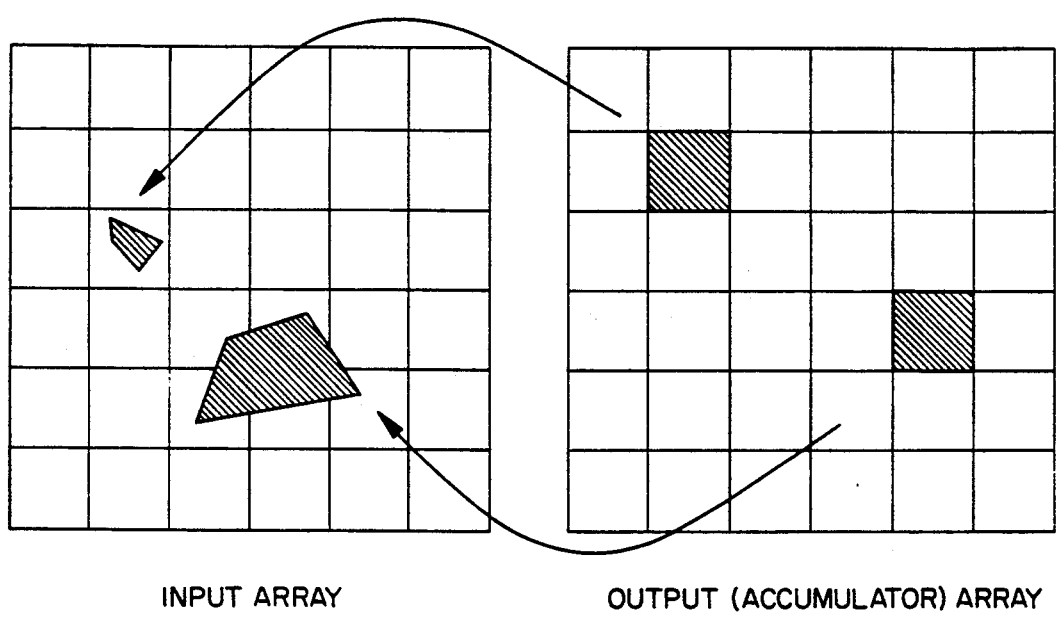
FIG. 1 is a diagram used in illustrating the effects of image warping.
Figure 2:
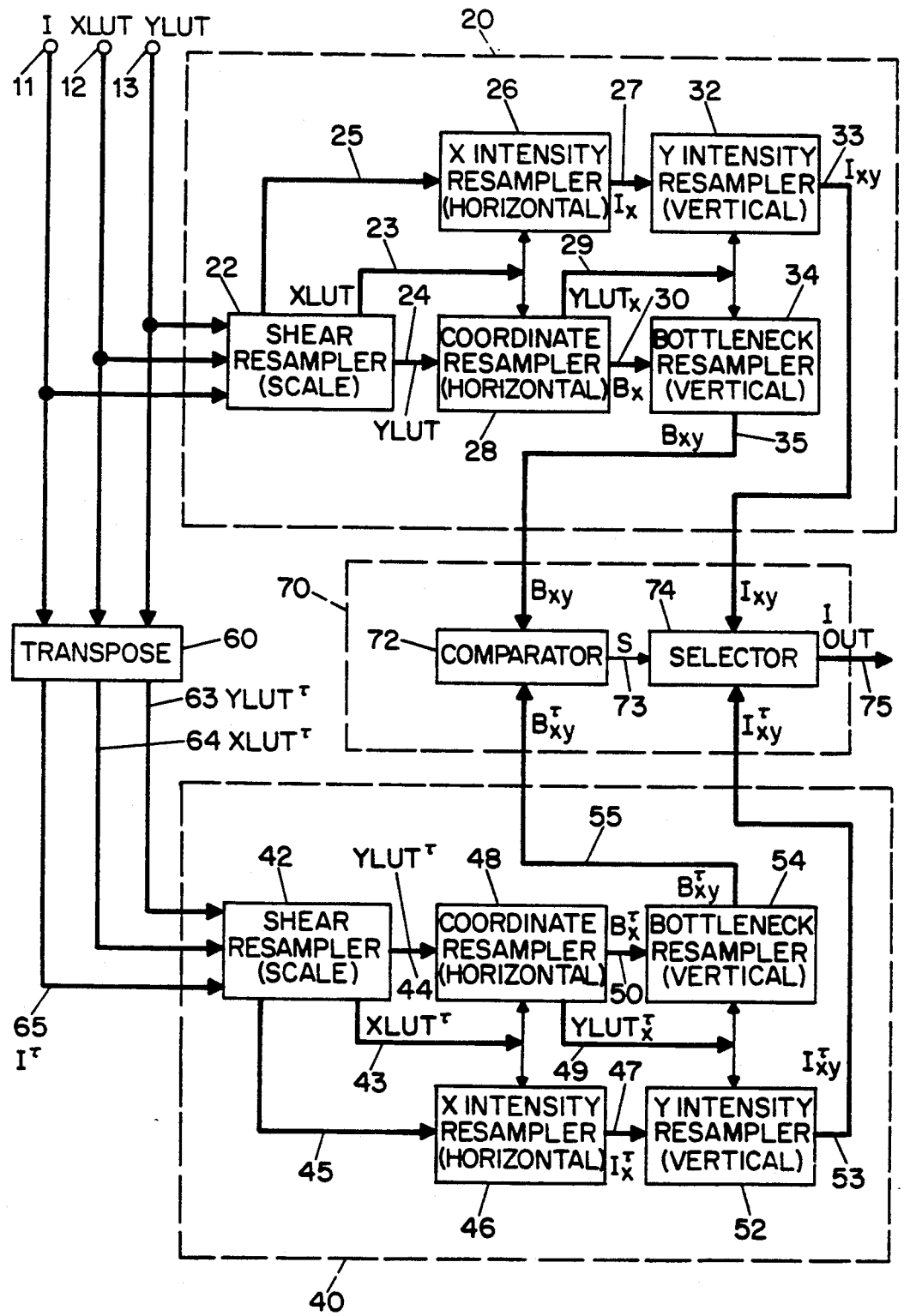
FIG. 2 is an algorithm block diagram of a preferred embodiment of the present invention showing the interaction of different components within the invention.

A preferred embodiment of a separable image warping system is illustrated in FIG. 2. As shown, bold arrows represent the flow of images and thin arrows denote data utilized in acting upon such images. The subscripts x and y are appended to denote images or signals which have been resampled in the horizontal and vertical directions, respectively.

Conceptually, the FIG. 2 system comprises four basic functions: intensity resampling, coordinate resampling, distortion measurement and compositing. The intensity resamplers 26 and 32 transform an input image applying a two-pass algorithm. Since bottleneck effects may occur, the process is repeated with a transposition of the input image. This accounts for the vertical symmetry of processing channels 20 and 40 of FIG. 2. Pixels which suffer excessive bottlenecking in processing through channel 20 can be recovered in the processing of the transposed image in channel 40. In this embodiment, the input image transposition takes the form of a 90° clockwise rotation, which avoids the need to reorder pixels left to right.

The coordinate resampler 28 in channel 20 develops data representing spatial or coordinate information utilized in operation of the intensity resampler 32. The resampler 28 warps or transforms y coordinate data, which will be described in the context of a spatial lookup table YLUT, so that the second pass via intensity sampler 32 can access coordinate data without the need for an inverse function. Note that except as described otherwise, structure and function of units within channel 40 are identical or similar to structure and function of corresponding units of channel 20.

In operation of the FIG. 2 system, local measures of image shearing, perspective distortion and bottlenecking are computed to determine the amount of information or data lost in each step. These determinations, together with the transposed and non-transposed results of operation of the intensity resamplers, are passed to the compositor 70, shown as comprising comparator 72 and selector 74. The final output image is generated by the selector 74 which selects pixels from the resampled image data out of channels 20 and 40 so as to exclude pixel values subject to information loss.

Input Image Signals

In FIG. 2, means for supplying input data to the system are shown as input terminals 11, 12 and 13 for respectively supplying data for input image I, x value data XLUT, and y value data YLUT. Generally, the input image data may represent values of intensity or luminance of a pixel or a plurality of pixels in a two-dimensional image, the values of chrominance components of a pixel in a three color component system such as red, green and blue, or any values relating to an image. Similarly, the XLUT input data may represent values of a first coordinate to which pixels of the input image are to be transferred in an output image and the YLUT data may represent such values for a second coordinate.

Scanline algorithms generally express the coordinate transformation in terms of forward mapping functions X and Y. Sampling X and Y over all input points yields data representative of two new real-valued images, designated as "XLUT" and "YLUT", specifying the point-to-point mapping from each pixel in the input image onto the output image. XLUT and YLUT will be referred to as spatial lookup tables since they can be viewed as 2-D tables which express a spatial transformation in the form of data representative of coordinate values.

In addition to XLUT and YLUT, as will be further discussed with reference to FIG. 3, provision is also made for the user to specify ZLUT which associates a z coordinate value with each pixel. This allows warping of planar textures onto non-planar surfaces, and is useful in dealing with foldovers. The objective, however, is not to solve the general 3-D viewing problem. The z coordinates are assumed to be from a particular point of view which the user determines before supplying ZLUT to the system. ZLUT and z coordinates will be discussed in greater detail below.

The reason for using spatial lookup tables is generality. The goal is to find a serial warp equivalent to any given parallel warp. This makes it impossible to retain the mathematical elegance of closed-form expressions for the mapping functions F, G, and the auxiliary function, H. However, assuming the forward mapping functions, X and Y, have closed-form expressions is overly restrictive. Instead, it is assumed that the parallel warp is defined by the samples that comprise the spatial lookup tables. This provides a general means of specifying arbitrary mapping functions.

For each pixel (u, v) in input image I, spatial lookup tables XLUT, YLUT, and ZLUT are indexed at location (u, v) to determine the corresponding (x, y, z) position of the input point after warping. This new position is orthographically projected onto the output image. Therefore, (x, y) is taken to be the position in the output image. (Of course, a perspective projection may be included as part of the warp). The z coordinate will only be used to resolve foldovers. This straightforward indexing applies only if the dimensions of I, XLUT, YLUT and ZLUT are all identical. If this is not the case, then the smaller images are upsampled (magnified or expanded) to match the largest dimensions.

Intensity Resampling

This section discusses how spatial lookup tables are used to resample intensity images. The 1-D intensity resampling algorithm is well-suited for hardware implementation and compatible with spatial lookup tables. It is the basis of the 2-pass intensity resampling stage embodied in resamplers 26 and 32 and related elements in FIG. 2.

The central benefit of separable algorithms is the reduction in complexity allowed by 1-D resampling algorithms. This provides efficient solutions for the image reconstruction and antialiasing components of resampling. A detailed description of such a 1-D algorithm that is well-suited for hardware implementation and compatible with spatial lookup tables is described in an article entitled "A Nonaliasing, Real-Time Spatial Transform Technique," by K. M. Font, *IEEE Computer Graphics and Applications*, , vol. 6, no. 1, pp. 71–80, January 1986 and in U.S. Pat. No. 4,835,532.

The present invention treats the input and output as streams of pixels that are consumed and generated at rates determined by the spatial mapping. The input is assumed to be mapped onto the output along a single direction, i.e., with no folds. As each input pixel arrives, it is weighted by its partial contribution to the current output pixel and integrated into a single-element accumulator. For input pixels that spread out over many output pixels, image reconstruction is currently implemented with linear interpolation. In terms of the input and output streams, one of three conditions is possible:

(1) The current input pixel is entirely consumed without completing an output pixel.
(2) The input is entirely consumed while completing the output pixel.
(3) The output pixel will be completed without entirely consuming the current input pixel. In this case, a new input value is interpolated from the neighboring input pixels at the position where the input was no longer consumed. It is used as the next element in the input stream.

If conditions (2) or (3) apply, the output computation is complete and the accumulator value is stored into the output array. The accumulator is then reset to zero in order to receive new input contributions for the next output pixel. Since the input is unidirectional, a one-element accumulator is sufficient. The process continues to cycle until the entire input stream is consumed in providing output pixel values for the final image.

Figures 5, 6:
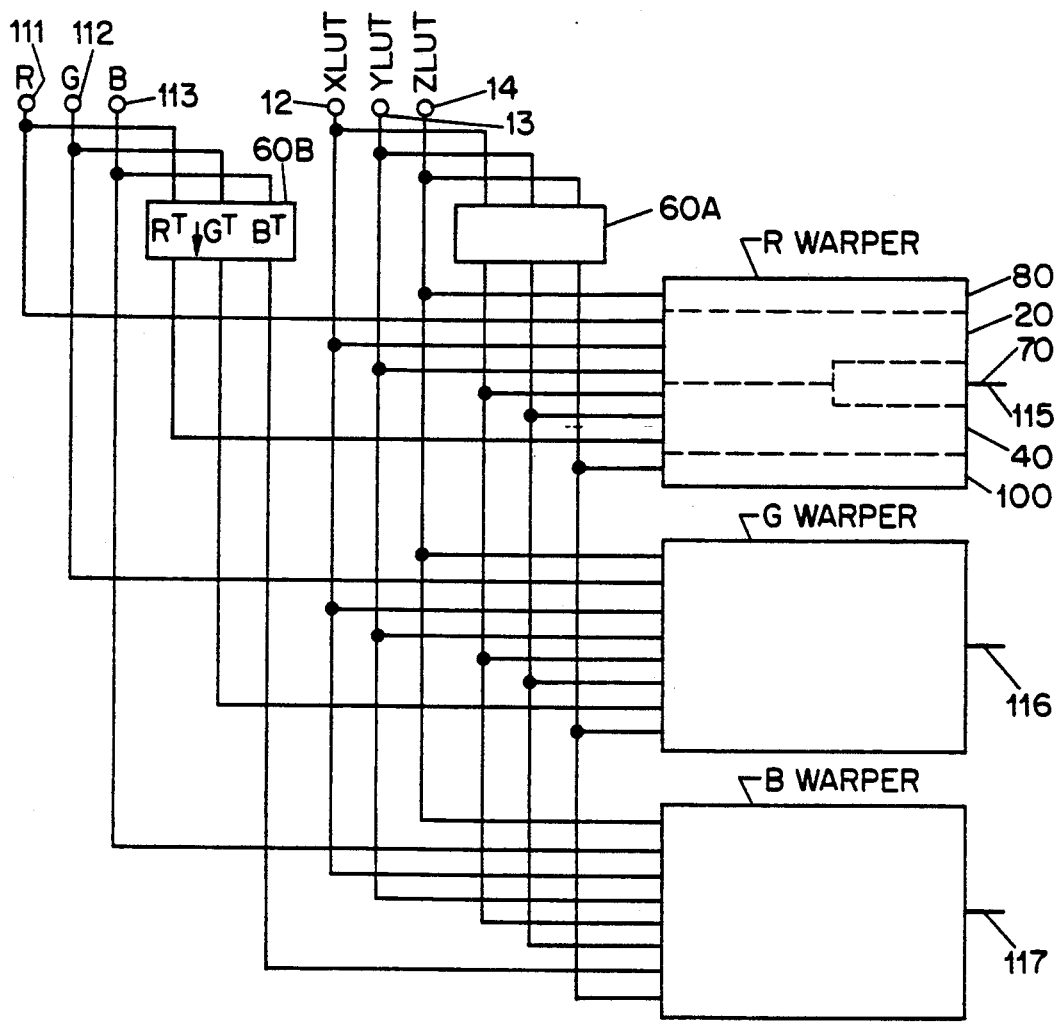
FIG. 5 illustrates an embodiment of the invention for use in carrying out separable image warping in a color image system.
FIG. 6 illustrates sample arrays representing possible values for different variables in the system.

As an example, consider the 1-D arrays shown in FIG. 6. The first row is taken from XLUT, the second from YLUT, and the third from input intensity image I. The next two arrays show YLUT and I resampled according to XLUT.

The computation of the resampled intensity values is given in FIG. 7. For clarity the following notation is used: interpolated input values are written within square brackets, weights denoting contributions to output pixels are written within an extra level of parentheses, and input intensity values are printed in boldface in FIG. 7.

The algorithm demonstrates both image reconstruction and antialiasing. When not positioned at pixel boundaries in the input stream, linear interpolation is used to reconstruct the discrete input. When more than one input element contributes to an output pixel, the weighted results are integrated in an accumulator to achieve antialiasing. These two cases are both represented in the above equations, as denoted by the expressions between square brackets and double parentheses, respectively.

An Alternative Resampling Algorithm

While the intensity resampling algorithm discussed in the previous section will be sufficient for some applications, greater accuracy may be required. In particular, it approximates the intensity for an interval, defined by adjacent elements of a spatial lookup table, according to the intensity value at the beginning of that interval. Thus when it multiplies by the length of the interval (to approximate the area coverage) it introduces errors proportional to the intensity gradient across the interval. The following resampling algorithm exactly computes the area coverage assuming linear interpolation between adjacent intensity values.

Briefly, after some initialization, the algorithm iterates the following process until the input is exhausted:

If the remaining part of the input pixel fits in one output pixel, compute the area coverage and add it to the accumulator. The area is obtained by finding midpoint of the current interval, using the gradient to compute the interpolation there, and then multiplying by the length of the interval. With linear interpolation, this midpoint rule provides the exact area of the region. Since that input pixel is finished, the next one is read as is its location. These new values are used to compute the intensity gradient for the next interval.

If the remaining part of the input pixel does not fit in one output pixel, compute the location of the next output pixel boundary and update the current position and fraction of input pixel remaining. Using the gradient information compute the value of the interpolated intensity half way to said boundary, and use this to compute the area coverage and obtain the resampled value, which is added to the accumulator before it is output and reset to zero.

The above description describes the algorithm conceptually. The following "C" code takes intensity values pointed to by a pointer IPT, and location values pointed to by LPT and resamples them into output pointed to by OPT. The code may appear oddly written, but it is intended to mimic the computation of the hardware shown later in this section. All code written on a single or continued line is computed in one hardware step. (To get correct behavior in software these statements need to be run sequentially because buffers are not simultaneously read and written as hardware registers are). Where possible the variable names match the hardware components they mimic.

```
#define     getnexti    curi = nexti;      nexti = *IPT++
#define     getnextL    curL = nextL;      nextL = *LPT++
getnexti; getnextL; dist=0;
while(dist==0){
    getnexti; getnextL;                            /*line continued*/
        inputexausted = nextL <0; nextL = abs(nextL);
    dist = nextL - curL; dir = dist <0;            /* normally we
        set dir = dist >0 but initialize so we don't
        initially call foldover; */
    if(dist != 0) div = (nexti -curi)/dist;        /* continued*/
        else if(inputexausted) {*OPT++ =0; return };
}
while(!inputexausted) {
    embed = ((trunc(nextL)                         /*continued*/
        - trunc(curL)) ==0);                       /*continued*/
    if(dir != (dist >=0)) foldover;                /*continued*/
    (dir = dist>=0); dist=abs(dist);
    if(embeded) {
        for(;;){ /* loop forever, break when dist != 0) */
            mult = dist * (curi + nexti)/2;        /*continued*/
            getnexti; getnextL;                    /*continued */
            inputexausted = nextL <0;              /*continued */
            nextL = abs(nextL);
            acc += multl; dist = nextL - curL;
            if(dist !=0) break;
        }
        div = (nexti - curi) / dist;               /*continued*/
        if(frac(curL) ==0) {*OPT++ = acc; acc=0;}
    } else {
        dist=dir ? (1-frac(curL)) : (abs(frac(curL)-1);
        mult = dist * div;                         /*continued*/
            if(dir) curL = trunc(curL) +1;         /*continued*/
            else curL = trunc(curL) -1;
        mult = dist * (curi + (curi += mult) )/2;
        acc += mult; dist =nextL - curL;
        *OPT++ = acc; acc=0;
    }
}
```

The above code is for resampling intensity. However, with minor modifications, it can be used as a coordinate resampling algorithm (which also benefits from the interpolation at midpoints, without area resampling). The modified code is:

```
#define     getnexti    curi = nexti;      nexti = *IPT++
#define     getnextL    curL = nextL;      nextL = *LPT++
getnexti; getnextL; dist=0;
while(dist==0){
    getnexti; getnextL;                            /*line continued*/
        inputexausted = nextL <0; nextL = abs(nextL);
    dist = nextL - curL; dir = dist <0;            /* normally we
        set dir = dist >0 but initialize so we don't
        initially call foldover; */
    if(dist != 0) div = (nexti -curi)/dist;        /* continued*/
        else if(inputexausted) {*OPT++ =0; return };
}
while(!inputexausted) {
    embed = ((trunc(nextL)                         /*continued*/
        - trunc(curL)) ==0);                       /*continued*/
    if(dir != (dist >=0)) foldover;                /*continued*/
    (dir = dist>=0); dist = 1; /* note changes */
    if(embeded) {
        for(;;){ /* loop forever, break when dist != 0) */
            mult = dist * (curi + nexti)/2;        /*continued*/
            getnexti; getnextL;                    /*continued */
            inputexausted = nextL <0;              /*continued */
            nextL = abs(nextL);
            acc += multl; dist = nextL - curL;
            if(dist !=0) break;
        }
        div = (nexti - curi) / dist;               /*continued*/
        if(frac(curL)==0) {*OPT++ =acc}
        acc = 0; /*note change*/
    } else {
        dist=dir ? (1-frac(curL)) : (abs(frac(curL)-1);
        mult = dist * div;                         /*continued*/
            if(dir) curL =                         /*continued*/
            trunc(curL) +1;
            else curL = trunc(curL) -1;
        mult = dist * (curi + (curi += mult) )/2;
        acc += mult; dist =nextL - curL;
        *OPT++ = acc; acc=0;
    }
}
```

Preferred Embodiment

Figure 9:
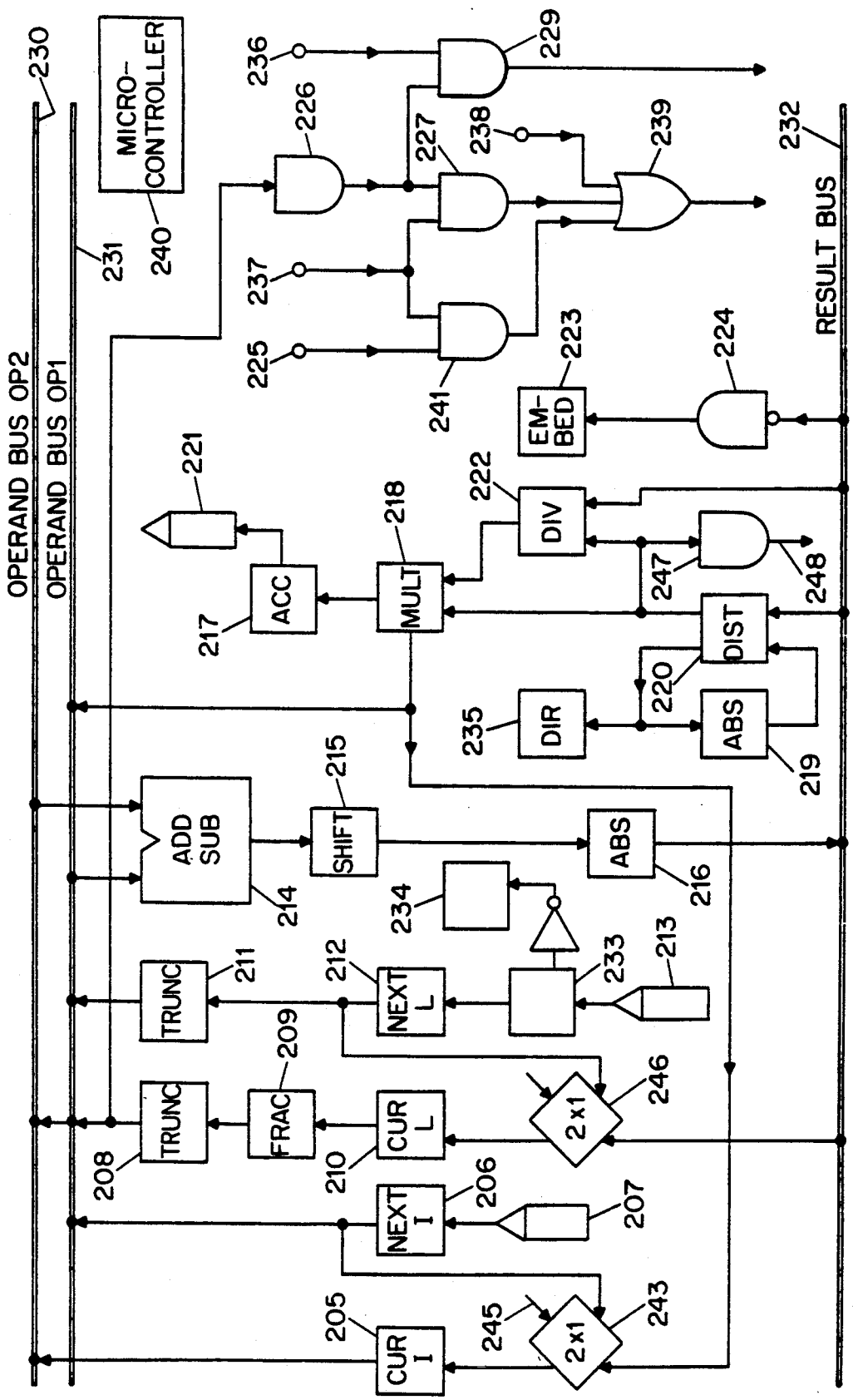
FIG. 9 is a block diagram illustrating a hardware representation of the alternative resampling algorithm.

While the above resampling algorithms can be implemented with any micro-processor, it is also possible to design dedicated resampling hardware as shown in FIG. 9. Note the large amount of the available parallelism, each row/column going through the resampling stage could use separate hardware. The design of a practical system would limit the number of components used so as to reduce cost, while still satisfying the data rate requirements.

As diagramed, in FIG. 8(a), at 200, it is assumed that computations are done on n bit fixed point numbers with f bits of fraction, d bits of integer, and one sign bit. It is further assumed that the number is in signed magnitude representation, though other number representations would not significantly change the hardware. The locations input to the system are assumed to be fixed point numbers of this type. The images which are used as input and output are assumed to be k bit numbers and might be either fixed point numbers or integers. FIGS. 8(b)–(e) are useful in describing operation of components 201–204, respectively, which are representative of components used in the circuit shown in FIG. 9.

The overall system, diagramed in FIG. 9, is controlled by a micro-controller 240, and has 3 buses 230,231 and 232, an n bit combinational adder/subtractor 214, an f bit by n bit multiplier unit 218 with n bit result register, an n bit by n bit division unit 222 with n bit result register, a shift unit 215, 2 registers with accumulation capabilities 210, 217, assorted n bit registers 205, 206, 212, 220, three one bit registers 234, 235, 223, a k bit image input buffer (with asynchronous access) 207, an n bit location input buffer (with asynchronous access) 213, a k bit output buffer (asynchronous access) 221, two 2 to 1 multiplexers (mux) 243, 246, two sets of digital logic components for conditionally truncating fixed point numbers 208,211, digital logic component 209 for conditionally setting the integer part of a fixed point number to zero, three sets of digital logic components 233, 216, 219 for computing the absolute value of a number, six multi-input AND gates 226, 227, 224, 229, 241, 247, and a 3 input OR gate 239. These components are interconnected as shown and described below in more detail.

The micro-controller 240 is a counter and memory unit, with a small amount of control logic (such controllers are available as standard components). In operation it goes through the sequence of statements in the microcode (given below), accessing in the memory in the location associated with the statement. The memory contains the signal to control the hardware, as well as the location of the next statement or statements if the command contains a potential branch. The microcode at the end of this section gives a symbolic description of the signals that are to be activated for the hardware control. The description of each the symbolic statements is given in the description of the associated hardware.

The two n bit buses, 230 and 231, supply the first and second operands (respectively) to the addition/subtraction unit 214. Access to the bus can be realized by using tri-state logic for those registers which load onto the bus. The enabling/disabling of the tri-state buffers for the registers will be accomplished by the micro-controller, 240. In the micro-code below, the access will be written as OP1bus< —name, OP2bus< —name, where "name" is the name of the register which is enabled. All other register will be disabled. The microcode command OP1< —1 (Op2— <1) loads the constant 1 onto the appropriate bus.

The n bit result bus 232 has only one input device 216 and thus does not need arbitration logic. The reading from the bus is controlled at the individual registers by the micro-control 240, and will appear in the microcode as name< — Rbus.

The shifter 215 can conditionally shift its input right or leave it unchanged. The statement DOSHIFT in the microcode enables shifting. This is combinational logic with no buffering.

The ABS units compute the absolute value of their input (in signed magnitude, this just sets the sign bit to 0), as diagramed in FIG. 8(e) 204. The units 216,219,233 are enabled by the code statements ABSADD, ABSDIST, ABSINPUT respectively. This is combinational logic with no buffering.

The frac unit 209, when enabled, sets the integer part of its input fixed point number to zero and sets the sign bit to 0 (positive), see FIG. 8(c) 202. When disabled, the data passes through. The enabling microcode is FRACCURL. This is combinational logic with no buffering.

When enabled, the trunc units 208,211, set the fractional parts of their respective fixed point inputs to zero, see FIG. 8(d) 203. When disabled they pass the data through. The enabling commands appear in the microcode as TRUNCCURL,TRUNCNEXTL. This is combinational logic with no buffering.

Unit 224 is a d bit NOR gate taking input from bits $f+1$ through $n-1$ of the Result bus 232. Its purpose is to check whether the integer part of the number on the bus is zero. It outputs a single bit which is stored in register EMBED 223. The AND gate is always operating, but the actual storing into 223 occurs only when enabled by the microcode statement SETEMBED. Unit 224 is combinational logic with no buffering. EMBED, 223 requires a single bit register.

Unit 234 is a single bit register referred to as INPUTEXAUSTED. It is stored into with each occurrence of the micro-code statement GETNEXTI. It is simply the complement of the sign bit of the number read from the input buffer 213. This follows the convention discussed elsewhere that the final location for the resampling will be negative, to signal termination. This bit is used in the micro-controller to terminate execution.

Register 235 is a single bit register referred to as DIR. When the command SETDIR is issued, this register is loaded with the sign bit of register dist 220. When the command SETNOTDIR is issued, it is loaded with the complement of the sign bit of register dist 220.

Unit 226 is an f bit AND gate that outputs a single bit signifying whether or not the fractional part of curL is zero. It is connected to the last f bits of the connection from trunc unit 208 to operand bus 230. The gate is always operational. This is combinational logic with no buffering.

The input AND gate 247 is used to avoid divide by zero conditions and simply determines whether or not DIST is zero. It outputs signal 248 which is referred to as ZERODISTP and can be used by the micro-controller 240.

Unit 229 is a two input AND gate which produces a signal by ANDing the output of 226 with 236 which is a bit provided by the micro-controller when the statement CONDITIONALOUTPUT is issued. When this signal is true, it will cause the data from accumulator 217 to be to coupled through the output buffer 221. This is combinational logic with no buffering.

Unit 227 is a two input AND gate combining the output of 226, with bit 237. Its purpose is to allow conditional clearing of the accumulator when doing intensity resampling. Bit 237 is a bit provided by the micro-controller when the statement CONDITIONAL-CLEARACC is issued. The signal is always computed. This is combinational logic with no buffering.

Unit 241 is a two input AND gate combining bits 237 and 225. Its purpose is to insure clearing of the accumulator when doing coordinate resampling (which occurs when the intensity resampler is doing conditional clearing). Bit 237 is a bit provided by the micro-controller when the statement CONDITIONALCLEARACC is issued. Bit 225 is a hardware switch and determines whether the resampler is being used for coordinate resampling (set to true) or intensity resampling (set to false). This is combinational logic with no buffering.

Unit 239 is a three input OR gate combining the output of 241, the output of 227 and the bit 238. This produces the control signal which is used to clear the accumulator 217. Bit 238 is provided by the micro-controller when the statement CLEARACC is issued. The signal is always computed. This is combinational logic with no buffering.

The buffers 207, 213, and 221 provide the interface for the hardware to the external environment. They are expected to operate asynchronously by, and are enabled with, the microcode statements GETNEXTI, GETNEXTL, and OUTPUT respectively. If the external environment is unable to supply or receive the data, the micro-controller will suspend execution until such time as the external environment is ready. The data read from the n bit accumulator 217 for the output is assumed to be converted to k bits by the buffer hardware. Similarly, image input buffer 207 converts the k bit input image data into the internal n bit fixed point numbers.

The n bit register with accumulator 205 is referred to as curi and holds the current value of the intensity at the current interpolation. It is needed to compute the area under the interpolation for intensity resampling, or it is the value if doing coordinate resampling. The input of the register is connected to a 2 to 1 mux 243 which operates as shown in FIG. 8(b). The mux inputs are connected to a multiplier unit 218 and to the output of nexti 206. The register 205 is enabled for storing when micro-code command GETNEXTI is issued, and the control line 245 for 2 to 1 mux 243 selects its second input. When the micro-code statement SETCURI is executed, the mux 243 will choose its first input and the register will accumulate the result, (i.e. add it to the result currently stored there). The control line 245 is supplied by the micro-controller.

The n bit register 206, referred to as nexti, holds the image data for the next point in the interpolation (the interpolation is between the values curi and nexti). Storing is enabled by the micro-code statement GETNEXTI, with inputs connected to the image input buffer 207.

The n bit register 210, referred to as curL, holds the location data for the current point along the interpolation. Storing is enabled when either the micro-control command GETNEXTL or TRUNCCURL is issued. The input is from the 2 to 1 mux 246. The control of mux 246 is supplied by micro-controller having the value 1 for command GETNEXTL and 0 otherwise.

The n bit register 212, referred to as nextL, holds the location data for the next point in the interpolation (interpolation is from location curL to location nextL). Storing is enabled by the micro-code statement GETNEXTL, with the inputs connected to ABS unit 233.

The adder/subtractor unit 214 is an n bit combinational fixed point adder/subtractor with inputs from buses 231 and 232. When the micro-control command DOADD is issued the unit adds its two operands, when the command DOSUB is issued it subtracts the operand from bus 232 from the operand supplied on bus 231. For either operation, both positive and negative numbers are allowed. The adder/subtractor has a flag ZEROP which is 1 if and only if the result of the current add/subtract is identically zero.

The n bit register with accumulator 217 is referred to as acc or as the accumulator. It holds the accumulation of the intensity for the current output pixel. The register acc 217 undergoes accumulation of its input when the command ACCUMULATE is given or when the output of unit 229 is true (a conditional accumulation). The input to acc is the output of the multiplier 218. When the signal to clear the accumulator is supplied (by OR gate 239), the accumulator loads the value 0.

The n bit register dist 220 serves two different purposes. It contains either the distance between location points and is used to compute the image gradient (supplied as an input to div unit 222) or it can contain the distance to the next pixel boundary when it is used as in input to the multiplier unit 218. The unit stores data from its input (result bus 232) when the micro-control command SETDIST is issued. When the command ABSDIST is issued, the unit loads its sign bit from unit 219.

The multiplier unit with storage 218 multiplies the f bit fraction on its left input (connected to the fractional field of dist 220) by the n bit fixed point number on its right input (from the storage of division unit 222). The unit might be a standard multiply unit (e.g. using the micro controller and a few extra registers), or might be accomplished by table lookup addressed by its n+f bits of input. The unit includes n bits of storage and the results of the multiply are not accessible until the next micro-cycle after the DOMULT command is issued.

The division unit with storage 222 computes the quotient of its left input with its right input. While shown as an n bit by n bit divide, for intensity resampling, it is easy to show that the numerator is an exact integer and thus can be assumed to have d bits (which would cut down on time and/or storage). Again this could be accomplished with either a standard micro-coded division algorithm or by table lookup. The unit computes and changes its output when the micro-coded command DODIV is issued.

Symbolic MICRO-CODE for resampling hardware.

Each new line of micro-code starts with a number. All commands on a single line are formed in parallel. The registers are capable of simultaneous read and write with the newly written value not accessible during the current micro-cycle. The code parallels the "C"-code from the beginning of this section.

```
001    GETNEXTI; GETNEXTL;
002    GETNEXTI; GETNEXTL;
```

```
003    op1 < -nextL; op2 < -curL;SETDIST;DOSUB;
004    if(not ZERODISTP) op1 < -nexti; op2 < -curi; DOSUB;
           DODIV; SETNOTDIR;
           if(ZERODISTP and INPUTEXAUSTED) OUTPUT; goto 001
           if(ZERODISTP and not INPUTEXAUSTED); goto 002
005    SETEMBED; SETDIR; ABSDIST;
           if(DIR xor DIST(n)) gosub foldover;
           if(INPUTEXAUSTED); goto 001
006    if(not EMBEDED) goto 010;
007    op1 < -nexti; op2 < -curi; DOADD; DOSHIFT; DOMULT;
           EMBEDED) GETNEXTI; GETNEXTL;
008    ACCUMULATE; op1 < -nextL; op2 < -curL;DOSUB; SETDIST;
           if(ZEROP) goto 007
009    op1 < -nexti; op2 < -curi; DOSUB; DODIV;
           CONDITIONALOUTPUT; CONDITIONALCLEARACC; goto 005;
010    if(DIR) op1 < -1; op2 < -curL; FRACCURL; DOSUB; SETDIST;
           if(not DIR) op1 < -curL; op2 < -1; FRACCURL; DOSUB;
SETDIST;
011    domult; TRUNCCURL;
           if(DIR) op1 < -1; op2 < -curL; DOADD;
           if(not DIR) op1 < -curl; op2 < -1; DOSUB;
012    DOMULT; SETCURI; op1 < -curi; op2 - <mult; DOADD;DOSHIFT;
013    OUTPUT;CLEARACC; goto 005;
```

Second Pass Intensity Resampling

Considering now two-pass intensity resampling, 1-D intensity resampling is applied to the image in two passes, each along orthogonal directions. The first pass resamples horizontal scanlines, warping pixels along a row in the intermediate image. Its purpose is to deposit them into the proper columns for vertical resampling. At that point, the second pass is applied to all columns in the intermediate image, generating the output image.

In FIG. 2, input image I is shown being warped according to XLUT to generate intermediate image $I_x$. In order to apply the second pass, YLUT is warped alongside $I_x$, yielding $YLUT_x$. This resampled spatial lookup table is applied to I, in the second pass. The result is output image $I_{xy}$. Referring more specifically to FIG. 2, the x intensity resampler means 26 develops intermediate pixel value data representing the input image pixel values of image I after being warped or resampled according to XLUT to give effect to image compression variations along the direction of a first coordinate x, to generate intermediate image $I_x$, at output 27. The term "compression variations" is defined as including shrinking (minification or "positive compression") or expanding (magnification or "negative compression") of an output image as compared to the input image from which it is to be transformed, as well as combinations of positive and negative compression as in a magnified output image including folds or ripples. Similarly, the y intensity resampler means 32 develops output pixel value data representing the intermediate image pixel values from output 27 of means 26 after being resampled according to $YLUT_x$, to give effect to image compression variations along the direction of the second coordinate y, to generate preliminary output image $I_{xy}$ at output 33. Note that while coordinates x and y are used for discussion, other coordinates may be used.

The intensity resampling stage must handle multiple output values to be defined in case of foldovers. This is an important implementation detail which has impact on the memory requirements for the algorithm. This aspect of the intensity resampler configuration and operation will be discussed below in a more detailed consideration of foldovers.

Coordinate Resampling $YLUT_x$ is computed in the coordinate resampler means 28 depicted in the second row of channel 20 in FIG. 2. The ability to resample YLUT for use in the second pass has important consequences: it circumvents the need for a closed-form inverse of the first pass. That inverse represents information transformed in the same manner as the image values after resampling in resampler 26, i.e., the u coordinate associated with a pixel in the intermediate image. Thus, instead of computing the inverse to index into YLUT, we simply warp YLUT into $YLUT_x$, allowing direct access in the second pass.

The coordinate resampler 28 is similar to the intensity resampler 26. It differs only in the notable absence of antialiasing filtering—the output coordinate values in $YLUT_x$ are computed by point sampling YLUT. Interpolation is used to compute values when no input data is supplied at the resampling locations. However, unlike the intensity resampler 26, the coordinate resampler 28 does not weigh the result with its area coverage nor does the resampler 28 average with the coordinate values of other contributions to that pixel. This serves to secure the accuracy of edge coordinates as represented in $YLUT_x$, even when the edge occupies only a partial output pixel.

The following example demonstrates the coordinate resampling algorithm. Consider the arrays shown before in FIG. 6. $YLUT_x$ in the example is the output of the coordinate resampling as computed below. Notice that the output consists of point samples taken at pixel boundaries in the output stream. They are not influenced by any other entries deposited into their respective output pixels. The computations are given in FIG. 10.

As mentioned before, the user can define ZLUT which associates a z coordinate with each pixel. As shown in the block diagram of FIG. 3, we also apply this resampling to ZLUT in exactly the same manner as it was applied to YLUT, as will be discussed further.

Distortions and Errors

In forward transformation or mapping, input pixels are taken to be squares that map onto arbitrary quadrilaterals in the output image. Although separable mappings greatly simplify resampling by treating pixels as points along scanlines, the measurement of distortion must necessarily revert to 2-D to consider the deviation of each input pixel as it projects onto the output.

The mapping of a square onto a general quadrilateral may be treated as a combination of translation, scaling, shearing, rotation, and perspective transformations. Inasmuch as separable kernels exist for realizing translations and scale changes, these transformations do not suffer degradation in scanline algorithms and are not considered further. Shear, perspective and rotations, however, offer significant challenges to the two-pass approach. In particular, excessive shear and perspective contribute to aliasing problems while rotations account for the bottleneck problem. Distortions and errors include the errors introduced by separable filtering and three sources of geometric distortion for two-pass scanline algorithms: shear, perspective, and rotation.

Filtering Errors

One of the sources of error for scanline algorithms comes from the use of cascaded orthogonal 1-D filtering. If rotation is ignored and processing of the image proceeds left-to-right and top-to-bottom, scanline algorithms will, in the first pass, filter a pixel based only on the horizontal coverage of its top segment. In the second pass, they will filter based only on the vertical coverage of the left-hand segment of the input pixel. As a result, a warped pixel generating a triangular section in an output pixel is always approximated by a rectangle as shown in FIG. 11. Note that this can be either an overestimate or underestimate, and the error depends on the direction of processing. This problem is shared by all known prior art scanline algorithms.

Shear

FIG. 12 depicts a set of spatial lookup tables which demonstrate horizontal shear. For simplicity, the example includes no scaling or rotation. The figure also shows the result obtained after applying the tables to an image of constant intensity (100). The horizontal shear is apparent in the form of jagged edges between adjacent rows. Scanline algorithms are particularly sensitive to this form of distortion because proper filtering is applied only along scanlines—filtering issues across scanlines are not considered. Consequently, horizontal (vertical) shear is a manifestation of aliasing along the vertical (horizontal) direction, i.e., between horizontal (vertical) scanlines. The prefiltering stage described below must be introduced to suppress these artifacts before the regular two-pass algorithm is applied.

This problem is a symptom of undersampled spatial lookup tables, and the ideal solution lies in increasing the resolution of the tables by sampling the continuous mapping functions more densely. If the continuous mapping functions are no longer available, then new values are computed from the sparse samples by interpolation. For example, linear interpolation can be used to increase the spatial resolution of XLUT and YLUT. The resulting image in FIG. 13 is shown to be antialiased, and clearly superior to its counterpart in FIG. 12. The values of 37 and 87 reflect the partial coverage of the input slivers at the output. Note that with additional upsampling, these values converge to 25 and 75, respectively. Adjacent rows are now constrained to lie within ½ pixel of each other. The error constraint can be specified by the user and the spatial resolution for the lookup tables can be determined automatically. This offers a convenient mechanism by which to control error tolerance and address the space/accuracy tradeoff. For the examples given, both horizontal and vertical shear are restricted to one pixel. While the shear problem may be slightly ameliorated by providing a different order or direction of processing, the key lies in overcoming undersampling in the lookup tables.

Perspective. Like shear, perspective distortions may also cause problems by warping a rectangle into a triangular patch, which results in significant filtering errors. In fact, if only the warp determined by any three corners of an input pixel is considered, it is not possible to distinguish shear from perspective projection. The latter requires knowledge of all four corners. The problem generated by perspective warping can also be solved by the same mechanism as for shears: resample the spatial lookup tables to ensure that no long thin slivers are generated. However, unlike shear, perspective also effects the bottleneck problem because, for some orders of processing, the first pass may be contractive while the second pass is expansive. This perspective bottlenecking is handled by the same mechanism as for rotations, as described below.

Rotation. In addition to jaggedess due to shear and perspective, distortions are also introduced by rotation. Rotational components in the spatial transformation are the major source of bottleneck problems. Although all rotation angles contribute to this problem, those beyond 45° can be considered to be inadequately resampled by a two-pass algorithm. This threshold is chosen as an example because 0° and 90° rotations can be performed exactly. If other exact image rotations are considered the worst case error is reduced to half the maximum separation of the angles. Local areas whose rotational components exceed 45° during processing in channel 20 are recovered from the transposed results from channel 40, where they will undergo a rotation less than 45°.

Distortion Measures. Consider scanning two scanlines jointly, labeling an adjacent pair of pixels in the first row as A, B, and the associated pair in the second row as C, and D. Let $(x_A,y_A)$, $(x_B,y_B)$, $(x_C,y_C)$, and $(x_D,y_D)$ be their respective output coordinates as specified by the spatial lookup tables. These points define an output quadrilateral onto which the square input pixel is mapped. From these four points the horizontal and vertical scale factors necessary to combat aliasing due to shear and perspective distortions can be determined, as can whether extensive bottlenecking is present. For convenience, we define $$\Delta X_{ij} = |X_i - X_j|; \; \Delta Y_{ij} = |Y_i - Y_j|; \; S_{ij} = \Delta Y_{ij}/\Delta X_{ij}$$

Pseudo-code for the procedure is given below.

```
bottleneck=0                          /* Initially no bottleneck */
IF (ΔY_AB ≦ ΔX_AB){                   /* AB remains horizontal */
    vfctr=max (ΔX_AC, ΔX_BD)          /* measure horizontal shear */
}ELSE IF (S_AB ≦ S_AC){                /* AC remains vertical */
    hfctr=max(ΔY_AB, ΔY_CD)           /* measure vertical shear */
}ELSE bottleneck=1                    /* bottleneck occurs */
```

Figure 14:
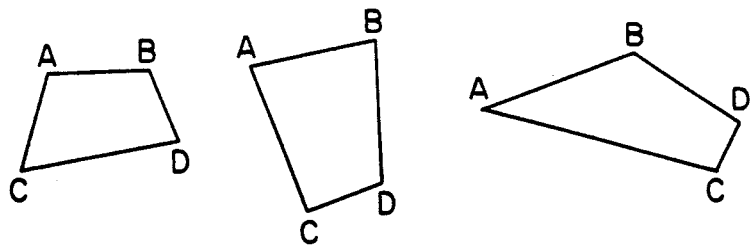
FIG. 14–FIG. 16 illustrates possible different conditions for transformation of quadulaterals.

If AB has not rotated from the horizontal by more than 45°, then its error due to bottlenecking is considered acceptable, and it is treated as remaining "horizontal." Only the vertical aliasing distortions due to horizontal shearing and/or perspective need to be considered in this case. The vertical scale factor, vfctr, for XLUT and YLUT is given by vfctr=MAX($\Delta X_{AC}$, $\Delta X_{BD}$). Briefly this measures the maximum deviation in the horizontal direction for a unit step in the vertical direction. To ensure an alignment error of at most $\epsilon$, the image must be rescaled vertically by a factor of vfctr/$\epsilon$. Examples of quadrilaterals that satisfy this case are illustrated in FIG. 14.

Figure 15:
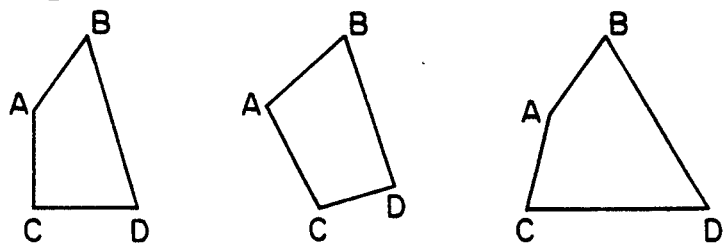

If AB is rotated by more than 45°, then it is treated as having become "vertical" and two possibilities exist: vertical shearing/perspective or rotation. In order to consider vertical shear/perspective, the magnitude of the slope of AC is measured in relation to that of AB. If $S_{AB} \leq S_{AC}$, then AC is considered to remain vertical and the pixel is tested for vertical shear/perspective. In order to enhance computational efficiency and to avoid divide-by-zero errors, the test condition is actually posed in terms of multiplication only. If the test condition is satisfied, the horizontal scale factor, hfctr, for the spatial lookup tables is expressed as hfctr=MAX(-$\Delta Y_{AB}$, $\Delta Y_{CD}$) Briefly stated, this measures the maximum deviation in the vertical direction for a unit step in the horizontal direction. Again, alignment error can be limited to $\epsilon$ by rescaling the image horizontally by a factor of hfctr/$\epsilon$. Examples of this condition are shown in FIG. 15.

Figure 16:
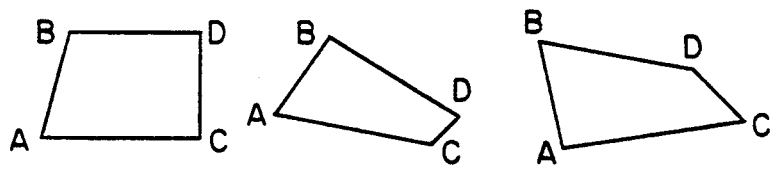

If, however, angle BAC is found to be rotated, (i.e., neither of the above tests are satisfied) then the entire quadrilateral ABCD is considered to be bottlenecked because it has rotated and/or undergone a perspective distortion. A bottleneck flag, or data indicator, is set to a value of one to denote the presence of the bottleneck problem at this pixel and, as described below, its contributions will be taken from the transposed result. This case is depicted in FIG. 16.

The pseudo-code fragment listed above is applied to each input pixel. The maximum values of hfctr/$\epsilon$ and vfctr/$\epsilon$ are used to scale the spatial lookup tables before they enter the two-pass resampling stage. In this manner, the output of this stage is guaranteed to be free of aliasing due to undersampled spatial lookup tables. In other embodiments this may be used as a local measure to provide a basis to adaptively resample the tables.

Bottleneck Distortion. The bottleneck problem was described above as a many-to-one mapping followed by a one-to-many mapping. The extent to which the bottleneck problem becomes manifest is intimately related to the order in which the orthogonal 1-D transformations are applied. The four possible orders in which a 2-D separable transformation can be implemented are listed above, under the heading "An Example-Rotation". Of the four alternatives listed, only variations (a) and (c) will be considered. Although variations (b) and (d) may have impact on the extent of aliasing in the output image, their roles may be obviated by up-sampling the spatial lookup tables before they enter the two-pass resampling stage.

A solution to the bottleneck problem thereby requires consideration of the effects which occur as an image is separably resampled with and without a preliminary image transposition stage. Unlike the Catmull-Smith algorithm referred to above, which selects only one variation for the entire image, operation in a more general domain may require an ability to deal with either of the two variations over regions of the image which are initially unknown. In accordance with the invention, this is addressed by the development of another image of identical dimensions which is computed in resampler 28 to maintain two-dimensional estimates of local bottleneck distortion.

A two-pass method is used to compute bottleneck distortion estimates at each point. As above, the bottleneck flag (a computational indicator) is determined for each input pixel. If no bottleneck distortion is present, then the area coverage of that input pixel is integrated into bottleneck image $B_x$ developed at output 30. By "no bottleneck distortion" in this context it is meant that no bottlenecking is present in excess of a predetermined measure or level, such as the 45° rotation standard referred to above. If, however, the bottleneck flag is set to one, then that pixel makes no contribution to $B_x$. The bottleneck image thus reflects the fraction of each pixel in the intermediate image not subject to bottleneck distortion in the first pass. The computations are straightforward, and serve a secondary function in that the data entries correspond exactly to the information or weighting needed for antialiasing in the intensity resample stage. Thus a local distortion measure is obtained at virtually no additional cost or complexity.

The second pass resamples intermediate image $B_x$ in resampler 34 in the same manner as the inlensity resampler 32, thus spreading the distortion estimates to their correct location in the final image. The result is a double-precision bottleneck-distortion image $B_{xy}$, with values inversely proportional to the bottleneck artifacts. The distortion computation process is repeated in resamplers 48 and 54 for the transpose of the image and spatial lookup tables, generating image $BT^T_{xy}$.

Since the range of values in the bottleneck image are known to lie between 0 and 1, it is quantized into N intervals for storage in a lower precision image with $\log_2 N$ bits per pixel. The number of intervals, such as sixteen, for example, provided in particular applications can be determined based on a space/accuracy tradeoff.

Foldover Problem

Up to this point, the warping algorithm in accordance with the invention has been considered as though both passes resulted in only a single value for each point. Unfortunately, this is often not the case—a warped scanline can fold back on itself. For instance, consider the 1-D arrays shown in the following table. They denote the input intensities I and their respective XLUT coordinate values for a given image row.

XLUT=0.6, 2.3, 3.2, 2.0, 4.2

I=100, 106, 92, 90, 90

Unlike the example in FIG. 6, note that XLUT is not monotonic. that is, XLUT now specifies a 1-D path which folds back upon itself, as the XLUT values successively increase, then decrease, then increase. In particular, the first three input pixel values are resampled and stored in the output in left-to-right order, occupying positions 0.6 through 3.2. Then, the output pixels are generated in right-to-left order as the third input pixel is stretched from x=3.2 to x=2.0. Finally, the last span is generated in left-to-right order from x=2.0 to x=4.2. Thus, two foldovers are present because two sign changes exist between adjacent entries in XLUT. Of course, when XLUT is monotonically increasing or decreasing, no foldovers exist.

In the prior art it has been proposed that multiple framebuffers be used to store each level of the fold. While this solution may be viable for low-order warps, it would be too costly to provide for arbitrary warps where the number of potential folds may be large. Furthermore, it is often the case that the folded area may represent a small fraction of the output image. Thus, using one frame buffer per fold would be both inefficient and very expensive.

To allow an image to fold upon itself, some means must be provided for determining which of the folds are to be displayed. The simplest mechanism, and probably the most useful, is to make provision for supplying not only XLUT and YLUT, but also ZLUT in order to specify the output z coordinate for each input pixel. In the first pass ZLUT will be processed in the same manner as YLUT, so the second pass of the intensity resampler can have access to the z-coordinates. Thus, as shown in FIG. 3, after processing within channel 80 by shear resampler 82, ZLUT is transformed in coordinate resampler 88 to develop $ZLUT_x$ at output 89 and coupled to intensity resampler 32. Transposed ZLUT values are similarly processed in channel 100 and coupled to intensity resampler 52 in channel 40.

One approach to using ZLUT in dealing with foldover is to use a z-buffer in computing the intermediate and final images. Unfortunately, while z-buffering will work for the output of the second pass as in resampler 32, it cannot work for the first pass in resampler 26 because some mappings fold upon themselves in the first pass only to have some of the "hidden" parts exposed by the second pass of the warp. Thus, a different means of making available all the data, including the foldovers, in the intermediate image, is required.

In accordance with the invention, multiple extra columns are made available for each column in the intermediate image. The extra columns, or layers, of memory space are allocated to hold information from foldovers on an as-needed basis. The advantage of this approach is that if a small area of the image undergoes folding, only a small amount of extra information is required. When the warp has folds, the intermediate image has a multi-layered structure as schematically illustrated in FIG. 17.

Figure 17:
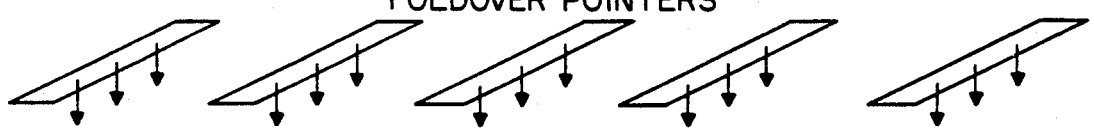
FIG. 17 schematically illustrates multi-layer structure of an intermediate image during warp fold representation.
Figure 17:
Figure 17:
Figure 17:
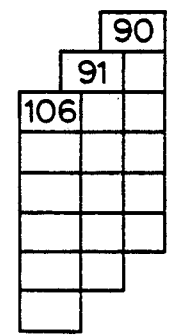
Figure 17:
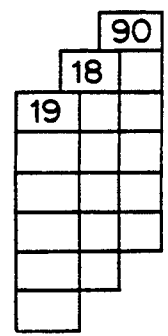
Figure 17:
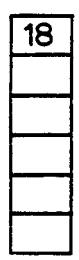

The entries in the layers are initialized with the resampled intensities given in FIG. 17. The intensities are computed exactly as described in the earlier intensity resampling section. The front layer, which we shall refer to as the zero foldover layer, is initalized with the first left-to-right span between XLUT values x=0.6 and x=3.2. the next span, from x=3.2 to x=2.0, forces several columns to become multi-valued as they are revisited. A further level of folding takes place when the last span, from x=2.0 to x=4.2 is processed. These pixels are made to occupy the next foldover layer in their respective columns. Notice that additional memory is needed only for those columns which have folds, not arbitrarily for the whole image. In general, each column in the intermediate image will have a different number of folds.

Figure 18:
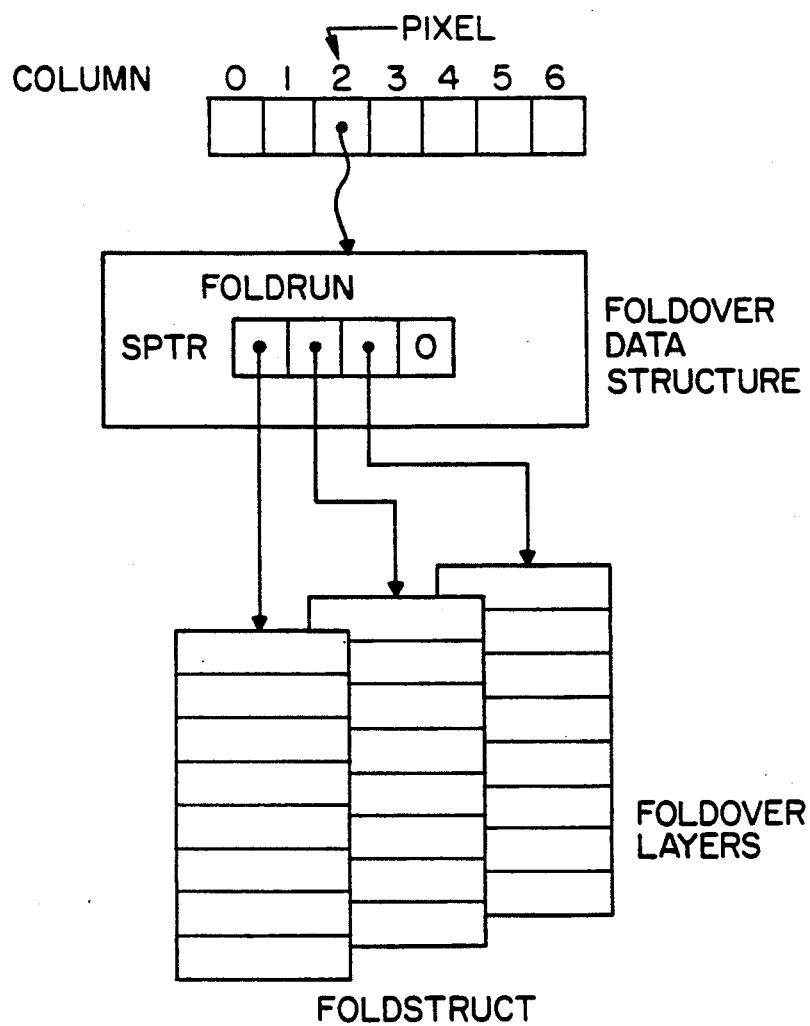
FIG. 18 is a block diagram demonstrating storage of data columns for proper handling of memory management for foldovers.

As a column is visited, it is necessary to determine into which of its foldover layers the incoming pixel must be deposited. Thus, each column stores a data structure to properly handle memory management for foldovers (FIG. 18). The data structure stores the following auxiliary information: a foldnum counter and an sptr list. The foldnum counter is incremented each time a column is visited. It indicates the number of the next foldover layer into which pixels must be deposited in case the column is revisited while processing the same row. This counter indexes into sptr, a list of pointers that address the individual foldover layers (vertical scanlines). A null-terminator is added to the end of sptr to signal the end of the list of foldover layers. In practice, these vertical scanlines are stored as ordinary horizontal scanlines. This allows them to be stored in contiguous memory and easily accessed in sequential order. Nevertheless, these scanlines will be referred to as vertical in the discussion that follows.

Initially, before the input image is processed, a vertical scanline is allocated for each column of the intermediate image and its address is appended onto the sptr list of its foldover data structure. If run-time memory allocation is deemed more expensive than memory space, then it is possible to allocate several foldover layers for each column before beginning resampling. This proves wasteful if all of the foldover layers for each of the columns are not needed. Furthermore, this places a ceiling on the number of foldovers allowed. A better solution is to allocate a block of vertical scanlines and distribute them to the necessary columns through a memory management unit on an as-needed basis. Additional blocks may be allocated to the memory management unit when its memory quota becomes exhausted due to excessive foldovers. This is the method currently preferred in accordance with the invention.

Initially, before a row is processed, foldnum is reset to zero for each column. Once a column is visited, the address of the appropriate vertical scanline is selected as the foldnum element in sptr. If that address is non-zero, then a valid address for the foldover layer has been found and that layer is used to store the incoming pixel. Otherwise, if the address is zero, we have reached the end of the list and a new foldover layer must be created. The address of that layer is then appended to sptr, and the incoming pixel is stored in that vertical scanline. the foldnum counter is then incremented to await the next fold that passes through that column.

Figure 19:
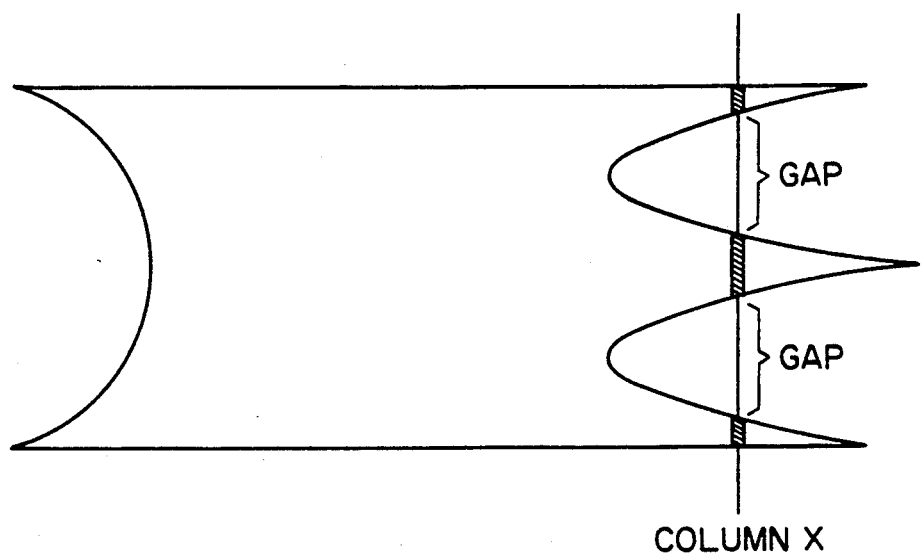
FIG. 19 is a graphic representation of the gaps which may exist in a scanline when the incoming pixels do not share sequential ordering.

The vertical scanlines used for the foldover layers warrant more attention. They are not simply columns indexed with a y coordinate. Rather, they are lists of pixels. The distinction lies in that the former instance considers the scanline to have a spatial organization, indexed by y. Gaps will exist if the incoming pixels do not share a sequential ordering in y. This can occur quite commonly in arbitrary warps. FIG. 19 demonstrates several examples of this phenomenon. Notice those columns with several spans of pixels, each separated by gaps. This has serious implications in the second pass upon filtering the vertical scanlines. In this context, gaps represent undefined spans to the 1-D digital filter that must effect the spatial transformation. That is, the intensity resampling stage would like to see a continuous stream of pixels to resample. Careful attention must be given to specifying the end of a pixel stream and the start of a new stream. As a result, we store any number of column spans in a list, each delimited by a special tag or indicator. Tags signal the end of pixel streams, so that each may be filtered separately. For arbitrary spatial transformations, this is certainly a requirement since the horizontal resampling pass cannot be guaranteed to yield an intermediate image with only one vertical span per column. Note that in the prior art, the imtermediate image was generally indeed treated as an image because it addressed limited cases which guaranteed this condition, i.e., affine and perspective transformations.

In order to signify the end of a vertical span, the negative value of the y-coordinates of $YLUT_x$ are stored. Since negative y-coordinates are considered invalid in this system (offsets must be added to make negative coordinates become positive), a negative coordinate is taken as a tag, or flag, that the 1-D resampling should stop at that point. Resampling then continues from the next point. Notice that this method leaves no gaps for the 1-D digital filter. Only the sign bit must be checked to signal whether resampling shall continue or restart with the next pixel.

Figure 20:
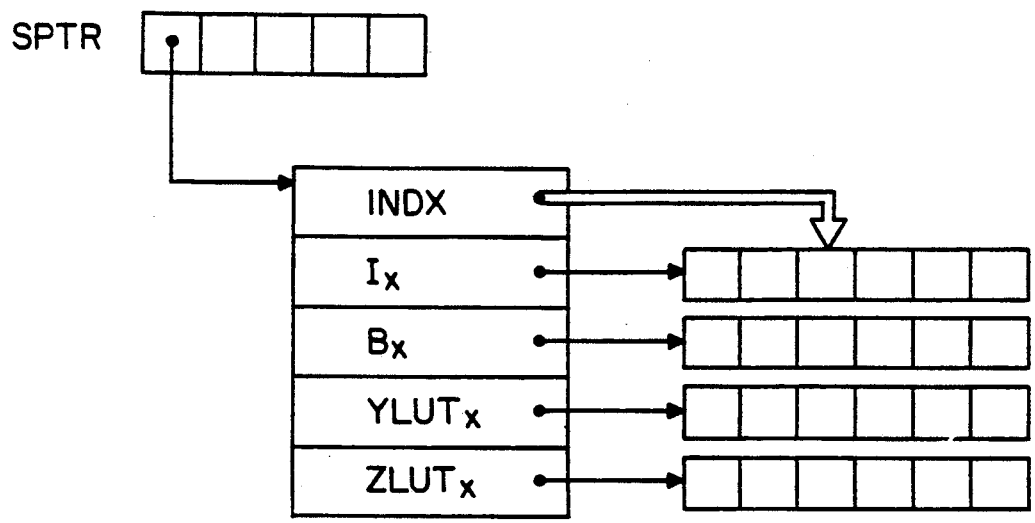
FIG. 20 is a block diagram illustrating data structure for vertical scanlines.

This introduces a new data structure for the vertical scanlines. Each scanline has an indx counter which specifies the next index in which to store the incoming pixel. The scanline also contains the pointers to the intensity, y coordinate, and z coordinate resampled data. FIG. 20 depicts the data structure for vertical scanlines. Notice that the multiple channels of information that comprise the intermediate image ($I_x$, $B_x$, $YLUT_x$, $ZLUT_x$) are collapsed into one structure for convenience. It is important to note that image $I_x$ can actually contain color channels, typically red, green, and blue. There is no processing dependence among the colors, therefore, all three color channels may be processed in parallel or in sequence.

Figure 21:
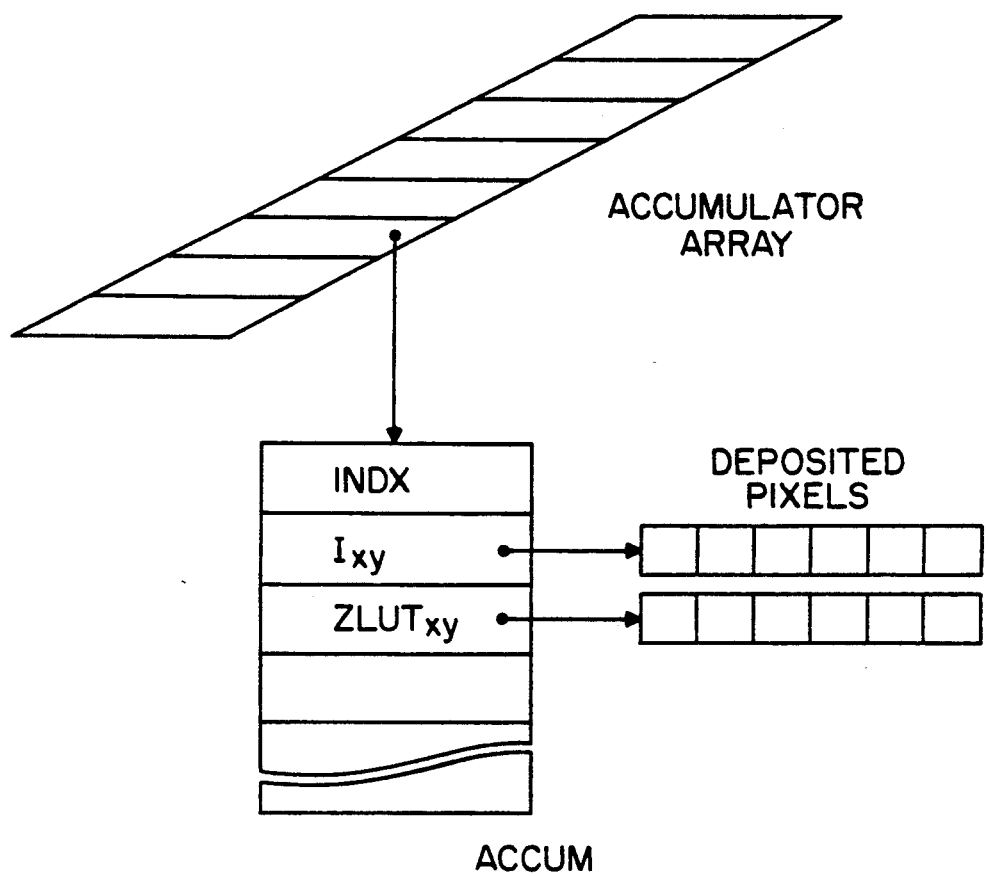
FIG. 21 is a block diagram illustrating an accumulator array with multiple pixels stored in a cell.

The second pass is responsible for depositing each pixel of the intermediate image into the proper row in the final image. Since multiple scans are possible for each column, an entire 1-D accumulator array is needed to collect their contributions. The accumulator array consists of a single vertical scanline which can, at each cell, store multiple pixels. Lists are used to collect pixel data, including $I_{xy}$, $B_{xy}$, and $ZLUT_{xy}Z$. In practice, it is possible to use the vertical scanline data structures for storing the contents of the accumulator array cells. FIG. 21 depicts an accumulator array with multiple pixels stored in a cell. Note that the vertical scanline structure is used to store the several channels in each pixel, i.e., $I_{xy}$, $B_{xy}$, and $ZLUT_{xy}$. Also note that foldovers are consistent within this framework because they are treated just like any other scan segment within the column. After all scan segments of each foldover layer for a given column have been added into the accumulator array, hidden surface elimination is performed to determine the visible pixels at each cell. This process makes use of $ZLUT_{xy}$ to determine which pixels lie in front, i.e., those pixels with the smallest z coordinate. Image values for pixels with larger z coordinate values for a specific pixel position in the output image are eliminated and do not appear in the output of intensity resampler 32.

It is not sufficient to simply store all the necessary foldover information in some structure for later processing. Given that folds do occur, the intermediate image must be properly filtered. Since filtering requires all the information from one foldover layer to be accessed coherently, it is necessary to track each layer across many rows of the image. For efficiency, this tracking uses a purely local match from one row to the next. More critical in the matching is determining when fold layers are created, terminated, or bifurcated. Note that, for the present, any "matching" must be a heuristic, since without strong assumptions about the warps, there is no available procedure to match folds from one row to another.

A heuristic solution to the matching problem useful in the illustrated embodiment uses three types of information: direction of travel when processing the layer (left or right in the row), ordering of folds within a column, and the original u coordinate associated with each pixel in the intermediate image.

First, layers are constrained to match only those layers where the points are processed in the same order. For instance, matching between two leftward layers is allowed, but matching between leftward and rightward layers is not allowed.

Secondly, the layers within a single column are assumed to be partially ordered. Within each column, every folded pixel in the current row is assigned a unique number based on the order in which it was added to the foldover lists. The partial order would allow matching pixels 12345 with 1? 2? 3? 4 (where the symbol ? indicates a match with a null element), but would not allow matching of 12345 with 1? 43? ? 2.

Finally, the u coordinate associated with each pixel is used to define a distance measure between points which satisfies the above constraints. The match is done using a divide-and-conquer technique. Briefly, first the best match is found among all points, i.e., minimum distance. The remaining potential matches are then subdivided to the left and to the right of the best match, thus yielding two smaller subsets on which to reapply the algorithm. Consistent with common solutions for related string matching problems, dynamic programming may be suitable for hardware implementations.

Consider a column which previously had foldover layers labeled 123456, with orientation RLRLRL, and original u coordinates of 10,17,25,30,80,95. If two of these layers now disappear or terminate leaving four layers, say abcd, with orientation RLRL and original u-coordinates of 16,20,78,101, then the matching would be done finding abcd matching 1256 respectively.

Once the matches are determined, the data must be rearranged so that the intensity resampler 32 (or 52) can access it in a spatially coherent manner. To facilitate this, each column in the intermediate image includes provision for a block of pointers that specify the order of the foldover layers. When the matching algorithm results in a shift in order, a different set of pointers is defined, and the valid range of the previous set is recorded. The advantage of this explicit reordering of pointers is that it allows for efficient access to the folds while processing.

The process is described from the point of view of a single column in the intermediate image, noting that all columns are processed identically. The first encountered entry for a row goes into the first or base layer or column. For each new entry into this column, the fill pointer is advanced (using the block of pointers), and the entry is added at the bottom of the next fold layer or column. After computing the "best" match incorrectly stored data is moved, the layers reordered and a new block of pointer values defined.

Continuing the example above where 123456 was matched to 1256, after the matching, the data incorrectly stored in columns 3 and 4 is moved into the appropriate location in 5 and 6. Finally the columns are reordered and the pointer blocks adjusted to reflect the new order 125634. The columns previously labeled 34 are marked as terminated, and considered as spares to be used in later rows as new fold layer begins.

A final aspect of the foldover problem is the effect on the 2-D intensity resampling process. The discussion above demonstrates that all the intensity values for a given column are collected in such a way that each fold layer is a separate contiguous array of spatially coherent values. Thus, the contribution of each pixel in a fold layer is obtained by standard 1-D filtering of that array. From the coordinate resampler 88, $ZLUT_{xy}$ is obtained and thus, merging the foldovers is equivalent to determining which filtered pixels are visible. Given the above information, a multi-level z-buffer algorithm is implemented to integrate the points in front-to-back order with partial coverage calculations for antialiasing. When the accumulated area coverage exceeds 1, the integration terminates. This z-buffer requires only a 1-D accumulator, which can be reused for each column. The result is a single intensity image combining the information from all visible folds.

Compositor

The compositor 70 generates the final output image by selecting the most suitable pixels from $I_{xy}$ and $I_{xy}^T$ as determined by the bottleneck images $B_{xy}$ and $B_{xy}^T$. A block diagram of the compositor is shown in center row of FIG. 2.

Bottleneck image $B_{xy}$ and $B_{xy}^T$ are passed through a comparator 72 to generate bitmap image S. Also known as a vector mask, S is initialized according to the following rule.

$$S[x,y] = (B_{xy}[x,y] \geq B_{xy}^T[x,y])$$

Images $S, I_{xy}$, and $I_{xy}^T$ selector 74 where $I_{out}$ is assembled. For each position in $I_{out}$, the vector mask S is indexed to determine whether the pixel value should be sampled from $I_{xy}$ or $I_{xy}^T$.

The comparator 72 is a combinational logic based subtraction unit which checks the sign of the difference of $B_{xy}[x,y]$ and $B_{xy}^T[x,y]$ to determine which number was larger. The vector mask S is stored in memory local to the comparator 70. Only one bit is needed per entry of S so the storage requirements are reasonable. With S stored, the selector can access S as well as the images $I_{xy}$ and $I_{xy}^T$ in any order. The order of processing for the selector will be the same order as that required for the output device, e.g. a two field interacting would be used for an NTSC output device. Note that the image S need only be computed for one channel in a three channel system as in FIG. 5.

An obvious extension to this component would be to use extra information (e.g., intensity, color, local intensity gradients) to determine whether the bit of S[x,y] should be 0 or 1 when the values of $B_{xy}[x,y]$ and $B_{xy}^T[x,y]$ are equal.

Summary of Operations

FIG. 2 system The operation of the FIG. 2 embodiment of a separable image warping system, for transforming input image data to output image data, in accordance with the invention may be summarized as follows.

Input image means, shown as input terminal 11, supplies data representing an image value, for each pixel of a plurality of pixels in a two dimensional image I, to the system. The image values may, for example, represent the intensity or luminance for each pixel of all or part of an image, represent values of a color image, such as a red, green or blue component or represent other values such as opacity, surface normals, etc. Similarly, the x value means and y value means, shown as input terminals 12 and 13, respectively, supply data representing values of two coordinates defining the location to which each input pixel of the image is to be transferred in the output image. In FIG. 2, these values are denoted as XLUT and YLUT which are characterized as look-up tables of the values of the first and second coordinates, x and y. These coordinates are horizontal and vertical in this example, but x and y are used generally and may be two other coordinates in other applications. The two coordinate data values may be two-dimensional values of a geometric model of any kind, as stored in a computer or on a disc or tape, for example, which is to be used to provide output image pixel locations. By also storing or otherwise making available the z coordinate values of a three-dimensional model, along with the x and y coordinate values, sufficient information can be provided for processing foldovers in arriving at the final two-dimensional output image data (see discussion of FIG. 3).

The FIG. 2 system is shown as comprising a first channel 20 for processing input image data to derive image values representing preliminary values of output image pixels. As shown, channel 20 comprises shear resampler 22, horizontal intensity resampler 26, coordinate resampler 28, vertical intensity resampler 32 and bottleneck resampler 34. In operation, the resamplers 26 and 32 carry out two-pass image warps or transformations responsive to coordinate data values developed through operation of the resamplers 22, 28 and 34.

Shear resampler 22, coupled to x value terminal 12 and y value terminal 13, evaluates coordinate value data for variations indicative of the presence of shear in the image for developing at first and second outputs 23 and 24 scaled x and y coordinate data representing XLUT and YLUT values of a magnified output image. By providing a plurality of pixel values in place of each pixel value of the basic output image, as by interpolation of input coordinate samples as discussed above, the spatial resolution of XLUT and YLUT is, in effect, increased to alleviate jagged edges indicative of undersampled coordinate data. Shear resampler 22 is also coupled to input image terminal 11 for developing at output 25 scaled input image data representing the input image after magnification consistent with that of the x and y coordinate data.

"Basic output image" is used to refer to the output image in its desired final format, (i.e.—before any magnification of the final image). First coordinate data is identified as XLUT at input terminal 12, as well as at output 23 of shear resampler 22. Although the data at output 23 may or may not have been subject to magnification, depending on the presence of shear conditions, for simplicity the same label is used. The same is true for YLUT (and ZLUT in FIG. 3).

The x intensity resampler 26 in FIG. 2 is coupled to outputs 23 and 25 of shear resampler 22 and operates to develop intermediate pixel value data at output 27. The resampler 26 performs the first pass of the two-pass warping process to provide intermediate pixel values representing input image pixel values after resampling to give effect to image compression variations (as defined above) occurring along the direction of the first or x coordinate.

Coordinate resampler 28 is coupled to outputs 23 and 24 of shear resampler 22 and functions to develop at a first output 29 modified second coordinate data. This data, indicated as $YLUT_x$, represents the scaled YLUT values from resampler 27 after resampling in resampler 28 responsive to XLUT values to give effect to image compression variations occurring along the direction of the first or x coordinate. At its second output 30 the coordinate resampler 28 develops a signal $B_x$, which represents excised y coordinate data representing YLUT data from putput 24 which has been resampled so as to delete values for pixels subject to positive compression variations identified as exceeding a predetermined level or measure of positive image compression in the x direction as a result of processing the input image to arrive at the output image data. As discussed above, rotation of an image element by more that 45° may be established as a predetermined level or measure indicative of excessive image compression distortion or bottle-necking. When this level is reached for a particular pixel, the bottleneck flag is set to zero for the purposes of succeeding computations.

The intensity resampler 32 in FIG. 2 is coupled to the x resampler 26 and the first output 29 of coordinate resampler 28, and operates to develop preliminary output pixel value data at output 33. The resampler 32 performs the second pass of the two-pass transformation process to provide preliminary output pixel values representing intermediate pixel values, from resampler 26, after resampling to give effect to image compression variations occurring along the direction of the second or y coordinate.

Bottleneck resampler 34 is coupled to outputs 29 and 30 of coordinate resampler 28 and operates to develop bottleneck data representing the $B_x$ data from sampler 28 after resampling to give effect to image compression variations along the second or y direction. The $B_{xy}$ signal at output 35 contains information indicating specific output pixels, for example, an indication of pixels whose values should be excluded from the final image in view of bottleneck distortion effects.

The FIG. 2 system also comprises transposing means shown as transposer 60 coupled to input terminals 11, 12 and 13. In one embodiment transposer 60 effectively stores the input image I data and reads out 90° transposed image data in the form of x value data resulting from scanning the image in what was originally the vertical direction, and y value data from scanning the image in the original horizontal direction, to develop transposed input image value data, indicated as $I^T$. The transposed first and second coordinate data are similarly developed as $XLUT^T$ and $YLUT^T$ representing x and y coordinate data of XLUT and YLUT, respectively, based on an image transposition or change in orientation.

Channel 40 in FIG. 2 is a second channel in parallel with channel 20 for performing many of the same functions with reference to the transposed values from outputs 61, 62 and 63 of transposer 60. Channel 40 is shown as comprising shear resampler 42, horizontal intensity resampler 46, coordinate resampler 48, vertical intensity resampler 52 and bottleneck resampler 34. Outputs of these units bear label numbers twenty integers higher than the corresponding elements of channel 20.

Shear resampler 22 and other units labelled as "resamplers" may desirably include data storage means, such as frame buffers, so that values or data developed in the resampler may be stored and read out in different pixel order, at different times, etc. In this way, for example, data developed at the output 53 of intensity resampler 52 representing pixel vlaues of the transposed image can be read out in an order corresponding to the order of the non-transposed pixel values at the output 33 of resampler 32.

Compositor means 70 as shown in FIG. 2 generates the final output image data $I_{out}$, by selecting the most suitable output pixel values as between preliminary output pixel values provided by channels 20 and 40. As shown, compositor 70 comprises comparator means 72 and selector means 74.

Comparator 72 coupled to outputs 35 and 55 of resamplers 34 and 54, respectively, compares the respective bottleneck image value data to develop a control signal S at output 73. Signal S is representative of which the preliminary output pixel values from channels 20 and 40 should be selected for inclusion in the final output image data.

Selector 74 in FIG. 2 is coupled to the y intensity resamplers 32 and 52 of channels 20 and 40, respectively, and to output 73 of comparator 72. Selector 74 operates to assemble the final output image including a value for each output image pixel selected from the output of either channel 20 or channel 40, in response to the S control signal from comparator 72.

Figure 3:
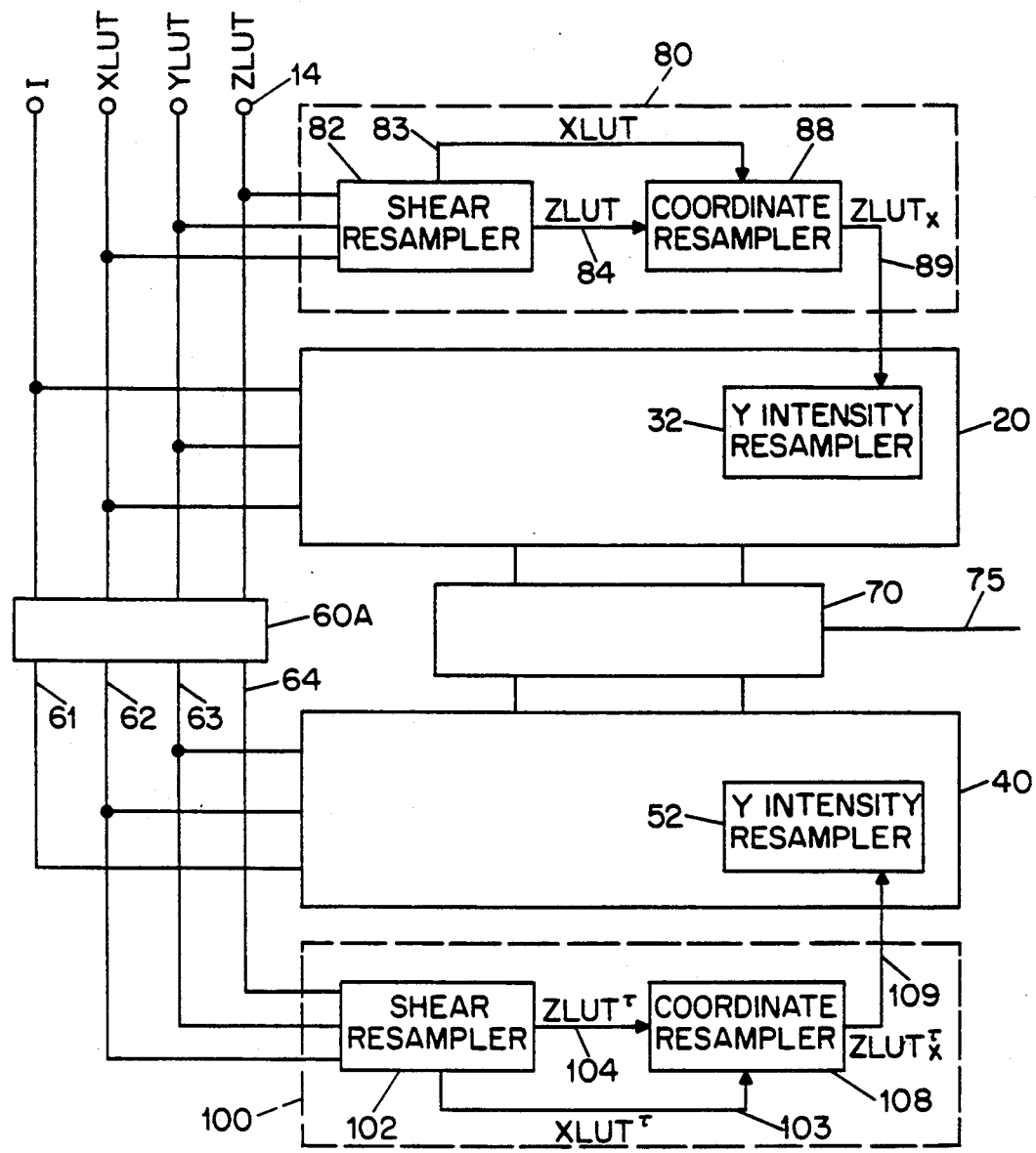
FIG. 3 illustrates the embodiments of the invention which additionally utilize input data representing a third coordinate.

FIG. 3 systems. FIG. 3 illustrates an embodiment of the invention which additionally utilizes input data representing a third coordinate.

In FIG. 3, channels 20 and 40, transposer 60A and Compositor 70 may be identical to the correspondingly numbered units of FIG. 2, except that transposer 60A additionally transposes ZLUT to provide $ZLUT^T$. The y intensity resamplers 32 and 52, of channels 20 and 40, may additionally be adapted for processing foldovers in response to the third coordinate information, as discussed above.

As described above, in order to properly process foldovers, lists or columns are provided in y intensity resampler 32 so as to store or make available data representing image values for folded image portions until it is determined which image portion is visible and which image portion or portions will not be included in the final image. ZLUT data provides values of a third coordinate z which includes information permitting such image foldover determinations to be made.

In FIG. 3, the z value means shown as input terminal 14 supplies ZLUT data representing values of a third coordinate designated as z, to generally represent any third coordinate not lying in the plane of the x and y coordinates. ZLUT data represents a third coordinate of a three-dimensional geometric model which may be supplied to terminal 13 from a computer, as discussed with reference to XLUT and YLUT in FIG. 2.

Figure 4:
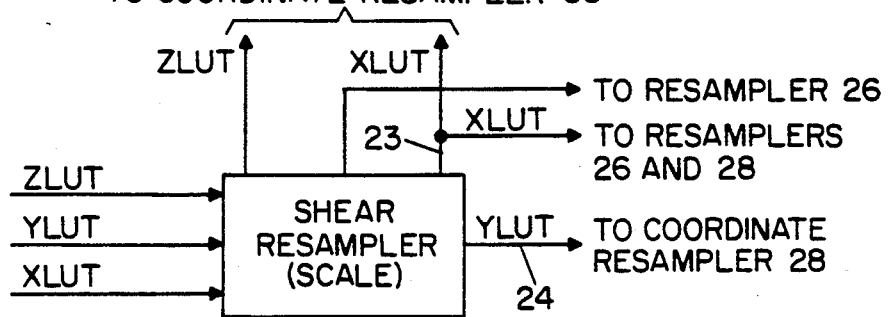
FIG. 4 is a block diagram illustrating an alternative form of shear resampler.

As shown in FIG. 3, two-pass transformation of third coordinate z value data is carried out in channel 80. Shear resampler 82, coupled to x value, y value and z value terminals 12, 13 and 14, respectively, operates on ZLUT in the same way shear resampler 22 operates on YLUT in FIG. 2, for developing at first and second outputs 83 and 84 scaled x and z coordinate data representing XLUT and ZLUT values. It should be noted that as an alternative to developing these XLUT values in channel 80, the XLUT values developed at output 23 of resampler 22, as shown in channel 20 of FIG. 2, can be supplied to coordinate sampler 88 in channel 80. FIG. 4 shows shear resampler 22A which in addition to developing XLUT and YLUT as previously described with reference to resampler 22, similarly develops ZLUT so that XLUT and ZLUT can be coupled to coordinate resampler 88 from resampler 22A, eliminating the need for an additional shear resampler 82 in channel 80. Shear resampler 102 in channel 100 can also be eliminated, by use of a similarly modified shear resampler in place of resampler 42 in channel 40.

Coordinate resampler 88 is shown coupled to outputs 83 and 84 of resampler 82 and functions to develop modified third coordinate data at output 89. This data, indicated as $ZLUT_x$, represents the scaled ZLUT values from resampler 82 after resampling in resampler 88 responsive to XLUT values to give effect to image compression variations occurring along the direction of the first or x coordinate.

The $ZLUT_x$ data at output 89 is coupled to y intensity resampler 32 in channel 20 for use in processing image sections subject to foldover, as discussed above.

Channel 100 is a second z coordinate channel in parallel alignment with channel 80 for performing the same functions with reference to the transposed values from outputs 62, 63 and 64 of transposer 60A. Channel 100 is shown as comprising shear resampler 102 and coordinate resampler 108. Outputs of these units bear label numbers twenty integers higher than the corresponding elements of channel 80. Output 109 of channel 100 is coupled to resampler 52 of channel 40 for the same purpose as discussed with reference to output 89 of channel 80.

FIG. 5 system. FIG. 5 illustrates an embodiment of the invention for use in carrying out separable image warping in a color image system.

In FIG. 5, warpers R, G and B each represent a complete warping system as illustrated in FIG. 3. This is indicated by the dotted portions of each of warpers R, G and B bearing the same label numbers as appear in FIG. 3. Thus, warper R is indicated as including units 20, 40, 70, 80 and 100, which will be understood to be interconnected in the same manner as the corresponding units are connected as shown in FIG. 3.

As shown in FIG. 5, transposer 60A has been repositioned and an additional transposer 60B has been added to similarly transpose R, G and B image value data supplied by input terminals 111, 112 and 113.

In operation of the FIG. 5 embodiment as illustrated, warper R processes image value data for one color component of an image by operating independently on that color data to develop the two-pass transformed output image data at output 115. Operational results are the same as if the input at terminal 11 in FIG. 3 were changed from I to B, with the result that the output at 75 represented final B output image data. By supplying red, green and blue components of a color image to terminals 111, 112 and 113, signals are developed at outputs 115, 116 and 117 that can be utilized to provide a transformed composite color image.

While FIG. 5 has been illustrated as incorporating three warpers R, G and B, each as shown in FIG. 3, it will be apparent that the signals at the outputs of the resamplers 22, 28 and 34 in channel 20 and resamplers 42, 48 and 54 in channel 40 of warper R are similarly usable in the respective channels 20 and 40 of warper G and warper B. Thus, these six resamplers need be provided only in one of the three warpers R, G and B and outputs appropriately supplied to the other two warpers. It will also be obvious that the z channels 80 and 100 can be omitted from the warpers R, G and B, so that these warpers will each have the make-up of the system shown in FIG. 2 and will lack capabilities dependent on the use of the z coordinate data.

EXAMPLES

Figure 22:
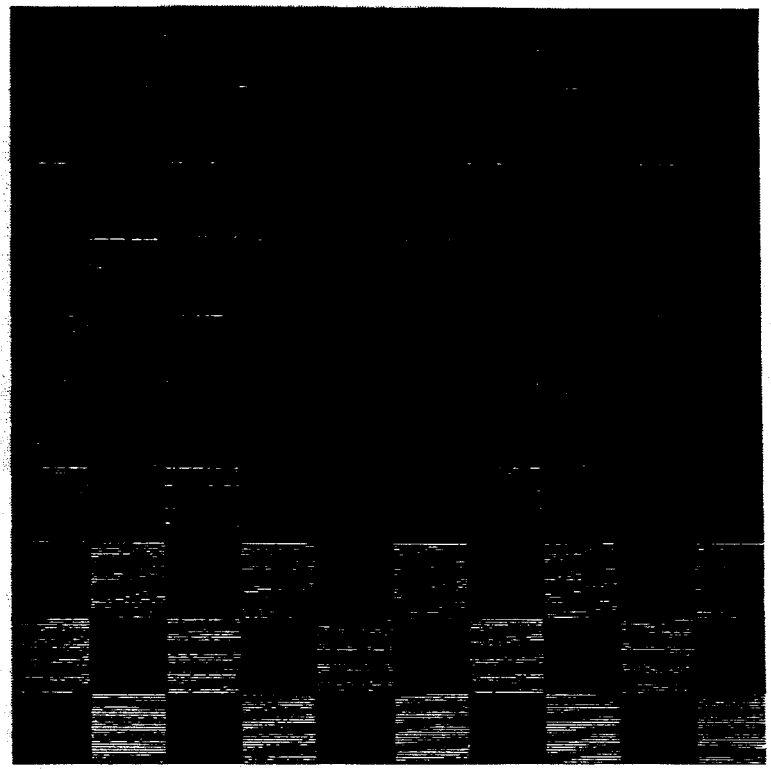
FIG. 22–FIG. 31(d) are examples of images and data fields existing during transformations in accordance with the invention.
Figure 23:
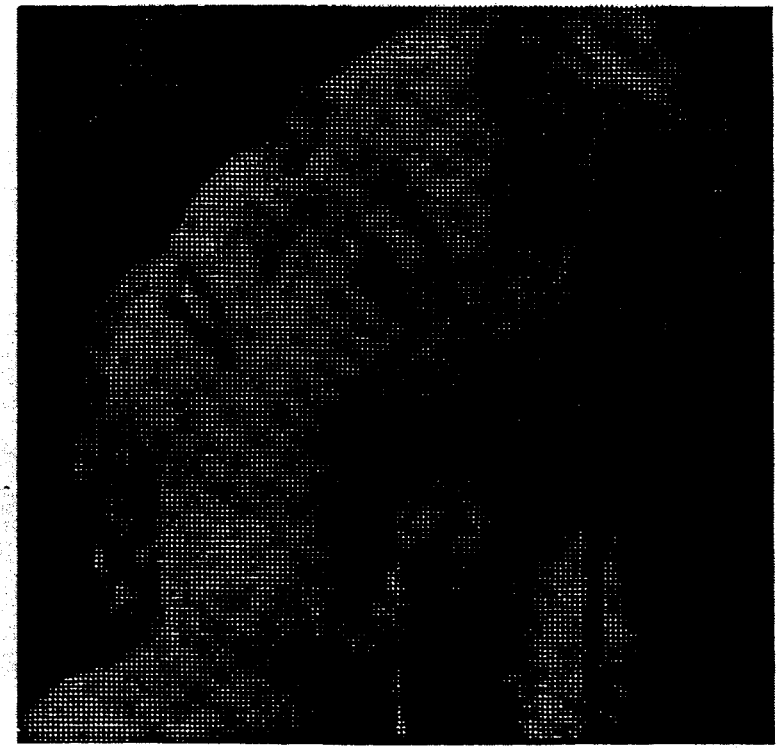

Examples of images and data fields illustrative of transformations in accordance with the invention are shown in FIGS. 22 through 31. FIGS. 22 and 23 show two images that will be used as source images for examples. These images will be referred to as the checkerboard and as Madonna (used with permission from Warner Bros. Records.) The vertical gradation of FIG. 22 from light to dark is useful in discerning positions of the top and bottom of the checkerboard in transformed images.

Figure 24:
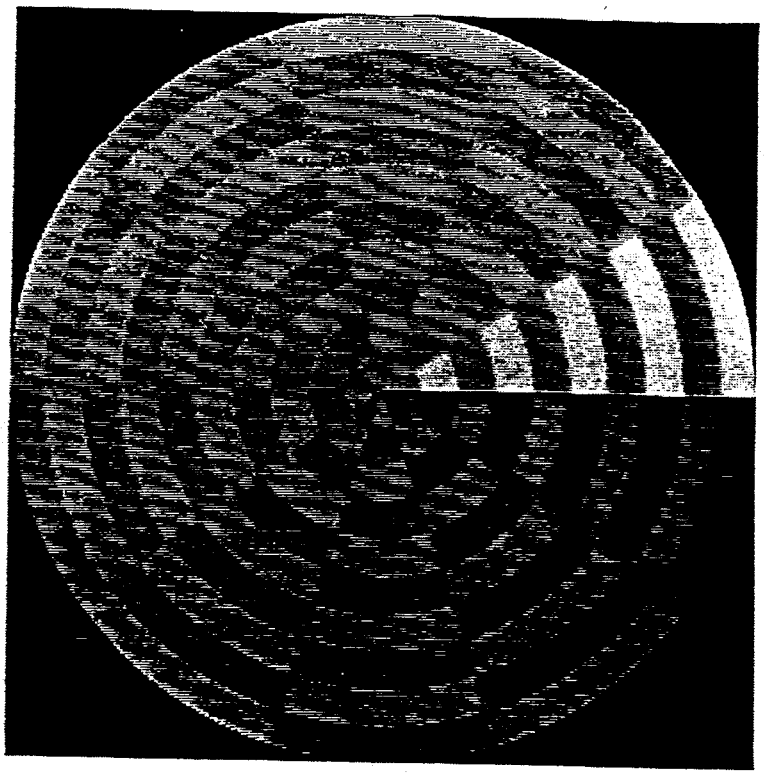
Figure 25:
Figure 26A:
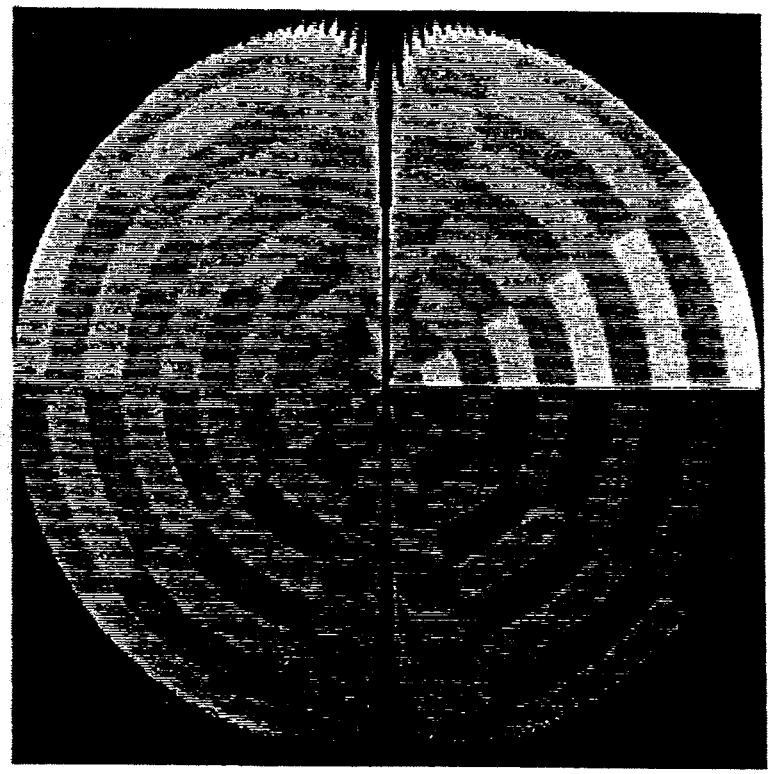
Figure 26B:
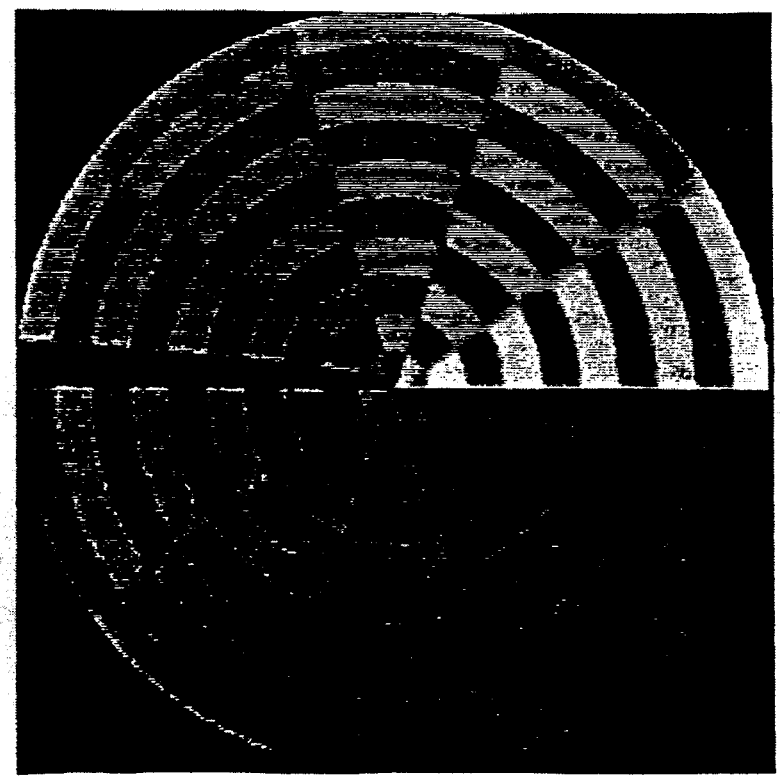
Figure 26C:
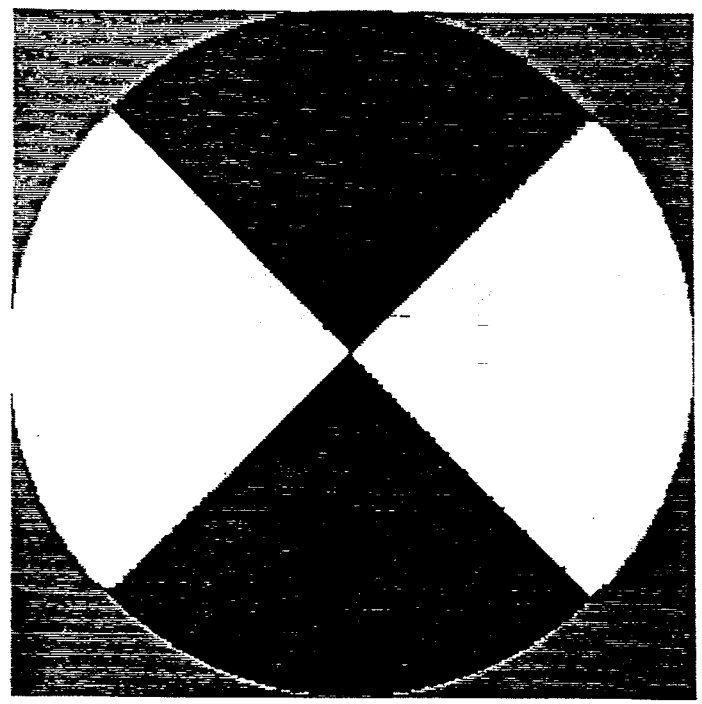
Figure 26D:
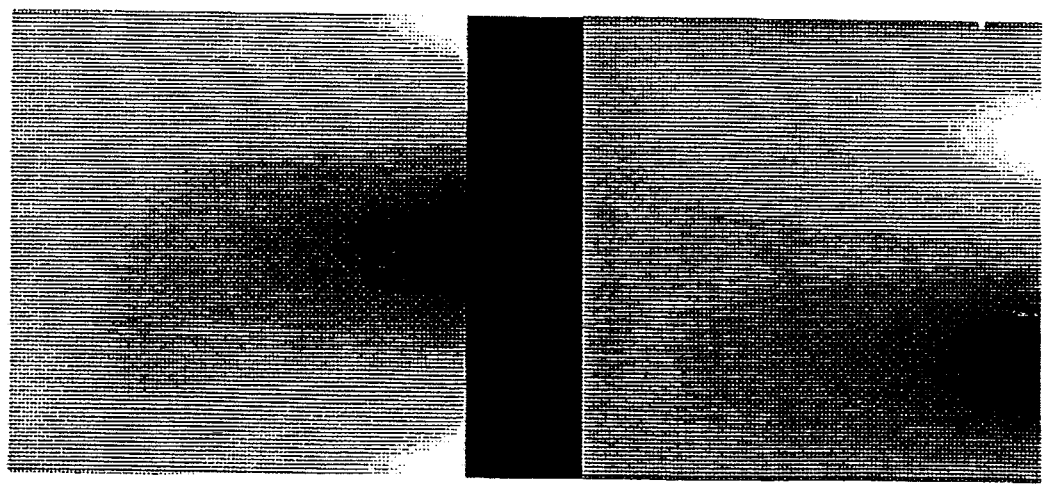

FIGS. 24 and 25 show the final results of warping the checkerboard and Madonna into a 360° circle. This transformation takes each row of the source image and maps it into a radial line. This corresponds directly to mapping from the Cartesian coordinate system to the polar coordinate system, i.e., (x,y) to (r,θ).

FIG. 26 (a) and (b) illustrate the outputs of the intensity resamplers 32 and 52 in FIG. 2 for the non-transposed and transposed processing. $I_{xy}$ from resampler 32 is shown in FIG. 26(a) and $I_{xy}{}^T$ from T resampler 52 is shown in FIG. 26(b). FIG. 26(c) shows S at the output of comparator 72 in FIG. 2. S, the vector mask image control signal, is used to select a value for each output image pixel from either $I_{xy}$ (white) or $I_{xy}{}^T$ (black) to generate the final output image at the output of selector 74 in FIG. 2.

Gray points in S denote equal bottleneck computations from both sources. Ties are arbitrarily resolved in favor of $I_{xy}{}^T$. Finally, in FIG. 26(d), the two spatial lookup tables XLUT (on left) and YLUT that defined the circular warp, are displayed as intensity images, with y increasing top-to-bottom, and x increasing left-to-right. Bright intensity values in the images of XLUT and YLUT denote high coordinate values. Note that if the input were to remain undistorted XLUT and YLUT would be ramps. The deviation from the ramp configuration depicts the amount of deformation which the input image undergoes.

Figure 27A:
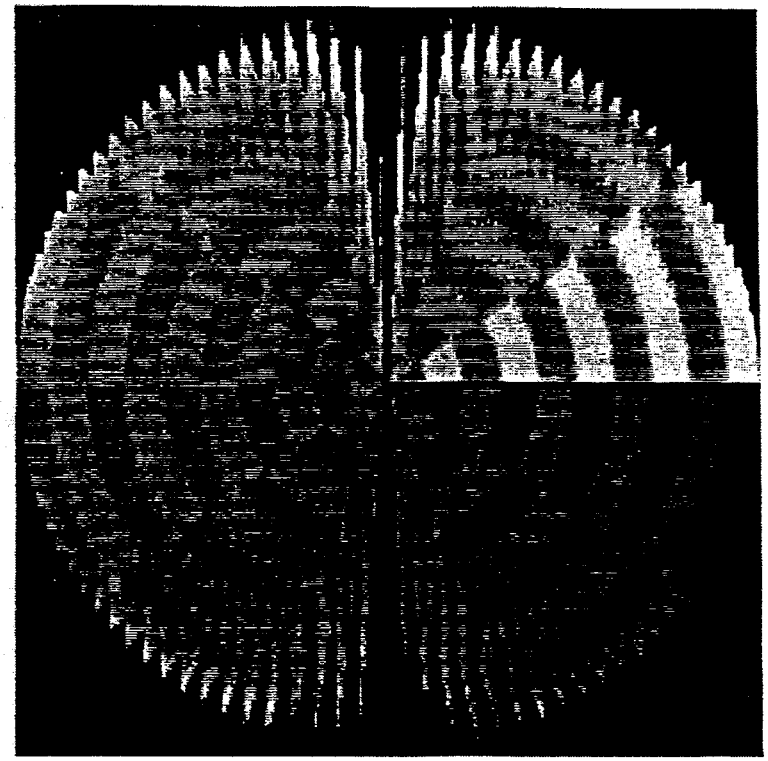
Figure 27B:
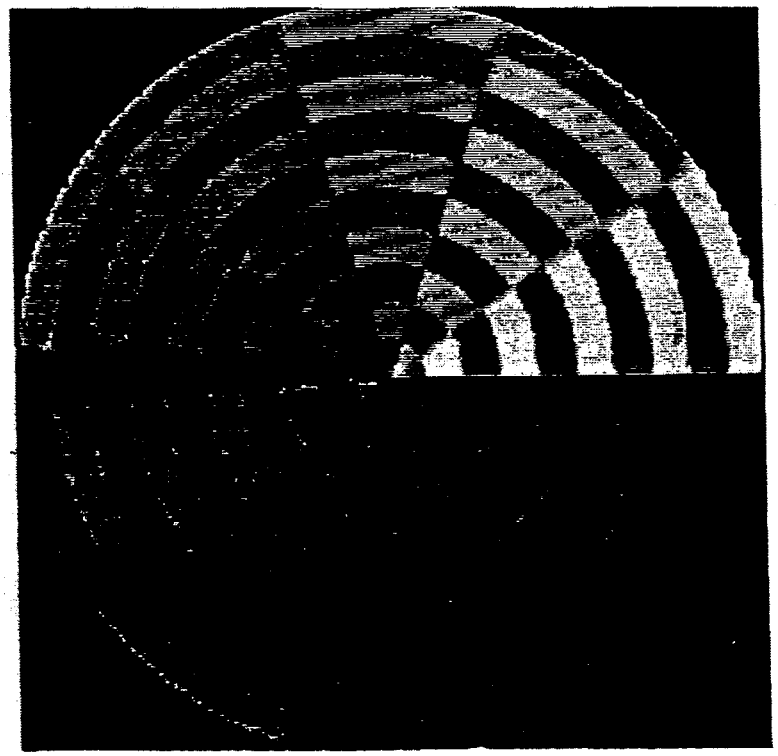
Figure 27C:
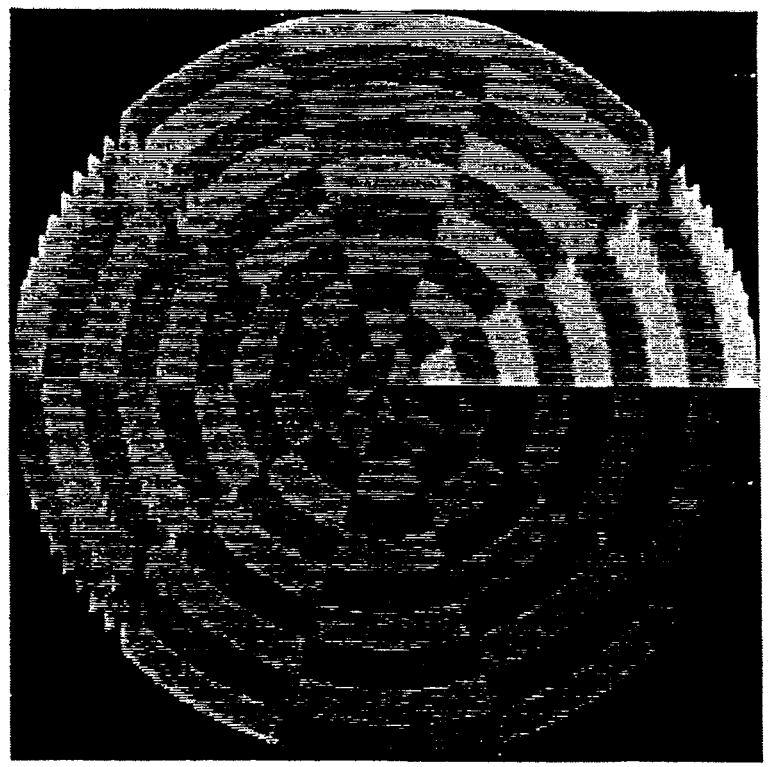

FIG. 27 demonstrates the effect of undersampling the spatial lookup tables. The checkerboard is again warped into a circle. However, XLUT and YLUT were supplied at lower resolution. FIG. 27(a) and (b) show $I_{xy}$ and $I_{xy}{}^T$, respectively, and FIG. 27(c) shows the output image at the output of selector 74 in FIG. 2. The jaggedess in the results are now more pronounced.

Figure 28A:
Figure 28B:
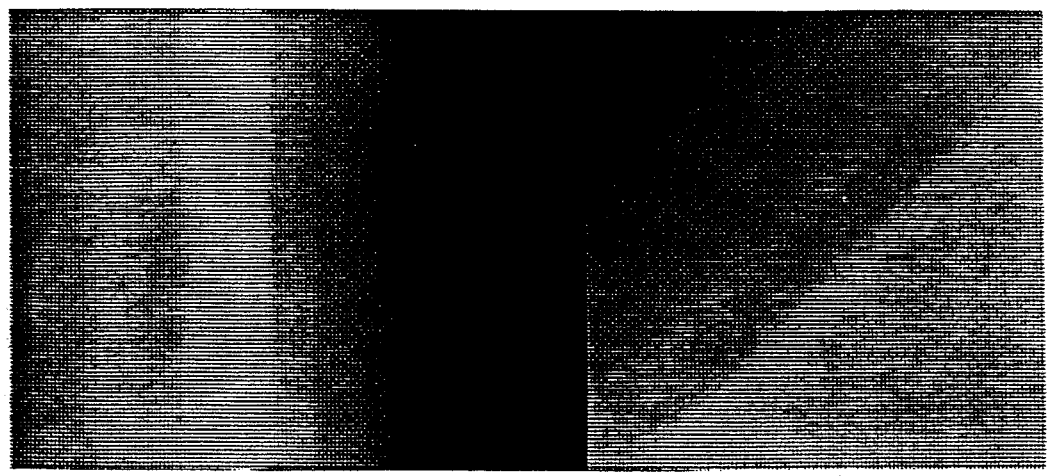
Figure 29A:
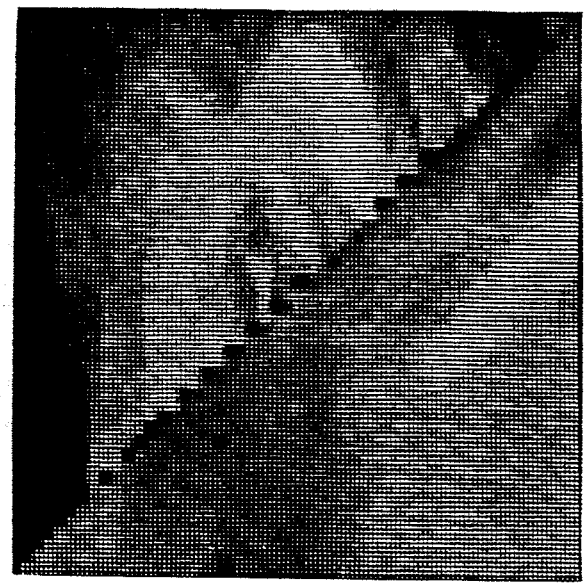
Figure 29B:
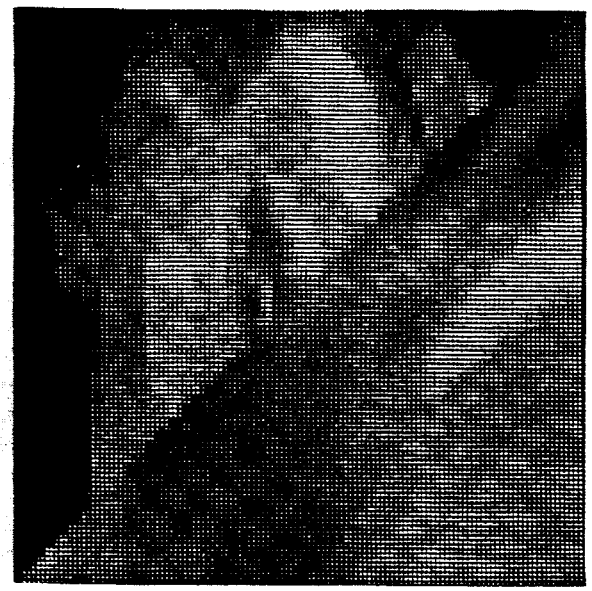
Figure 30A:
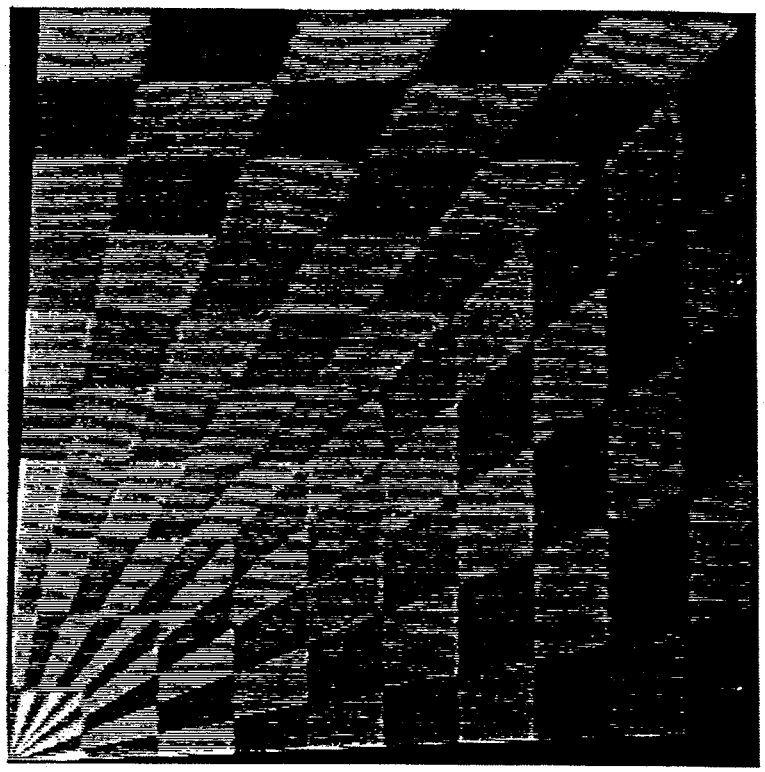
Figure 30B:
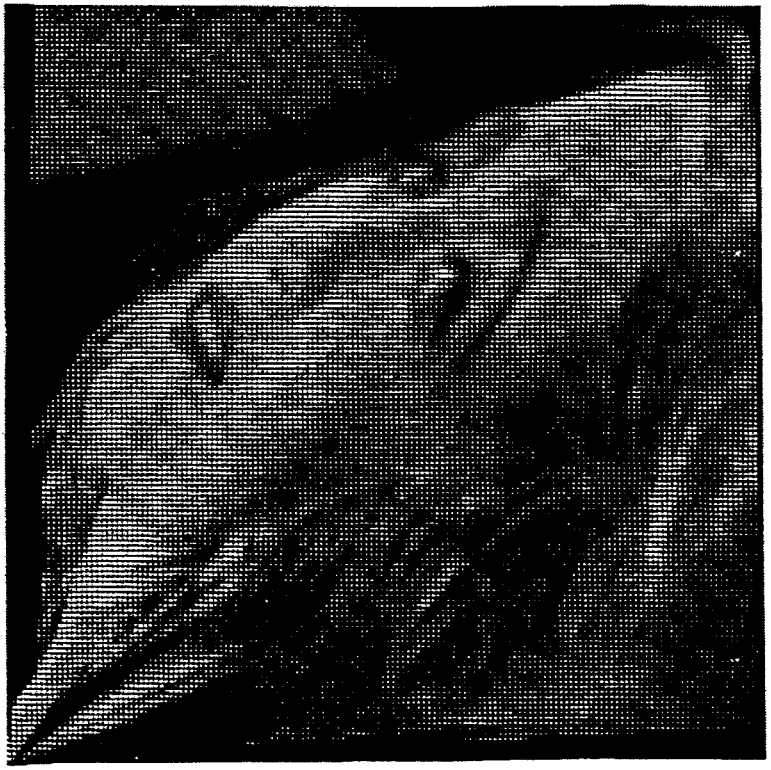
Figure 30C:
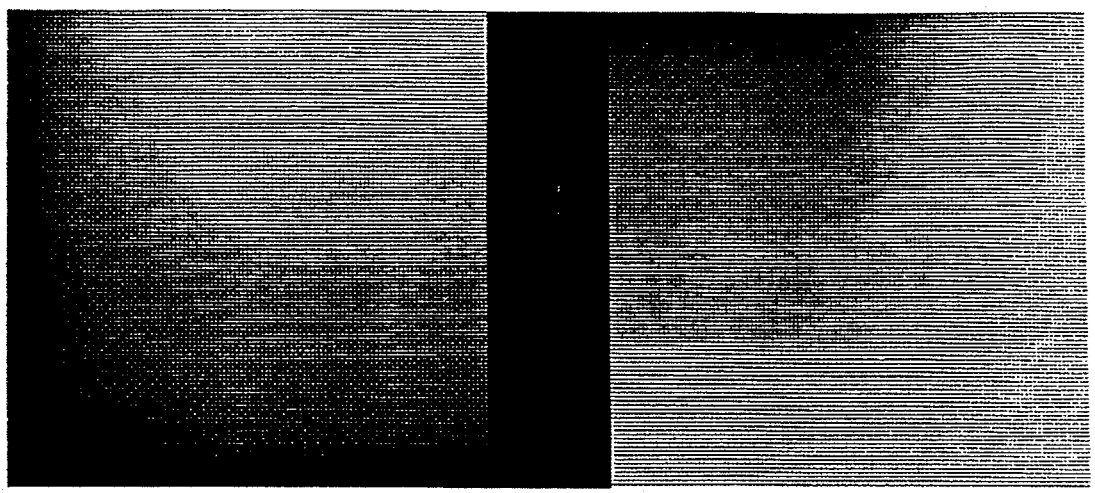
Figure 30D:
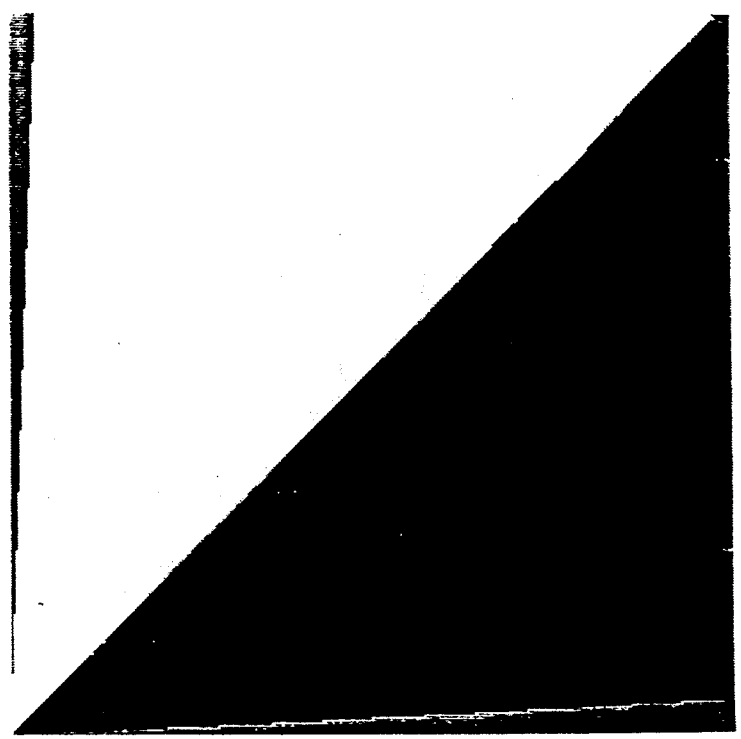

FIG. 28(a) illustrates an example of foldover. FIG. 28(b) shows XLUT (on left) and YLUT. A foldover occurs because XLUT is not monotonically increasing from left to right. In FIG. 29 (a) and (b), the foldover regions are shown magnified (with pixel replication) to highlight the results of two different methods of rendering the final image. In FIG. 29(a) the closest pixels were simply selected. Note that dim pixels appear at the edge of the fold as it crosses the image. This subtlety is more apparent along the fold upon the cheek. The intensity drop is due to the antialiasing filtering that correctly weighted the pixels with their area coverage along the edge. This can be resolved by integrating partially visible pixels in front-to-back order. As soon as the sum of area coverage exceeds 1, no more integration is necessary. In accordance with the invention, the bottleneck image can be used to directly supply the area coverage data. The improved result appears in FIG. 29(b).

FIG. 30 shows the result of bending horizontal rows. For the checkerboard, in FIG. 30(a), and Madonna, FIG. 30(b). FIG. 30(c) illustrates XLUT (on left) and YLUT and FIG. 30(d) shows S at the output of selector 74. As we scan across the rows in left-to-right order, the row becomes increasingly vertical. This is another example in which the traditional two-pass method would clearly fail since a wide range of rotation angles is represented.

Figure 31A:
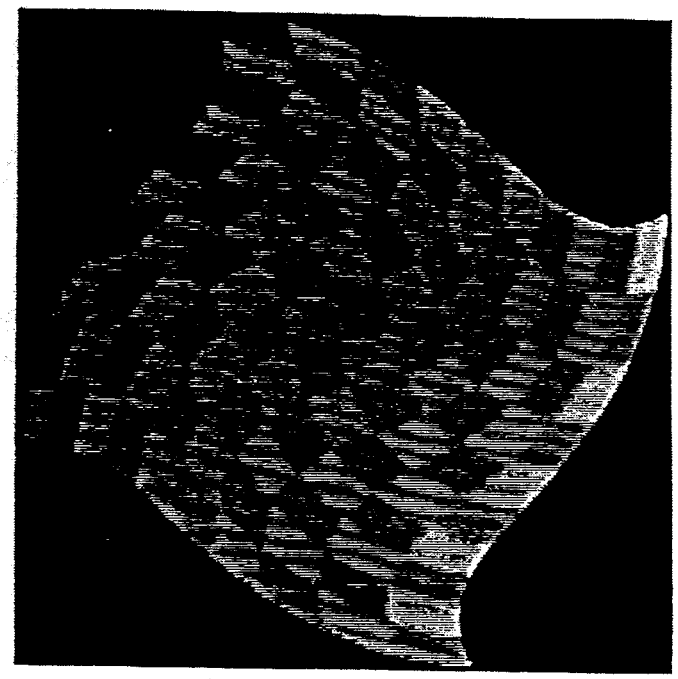
Figure 31B:
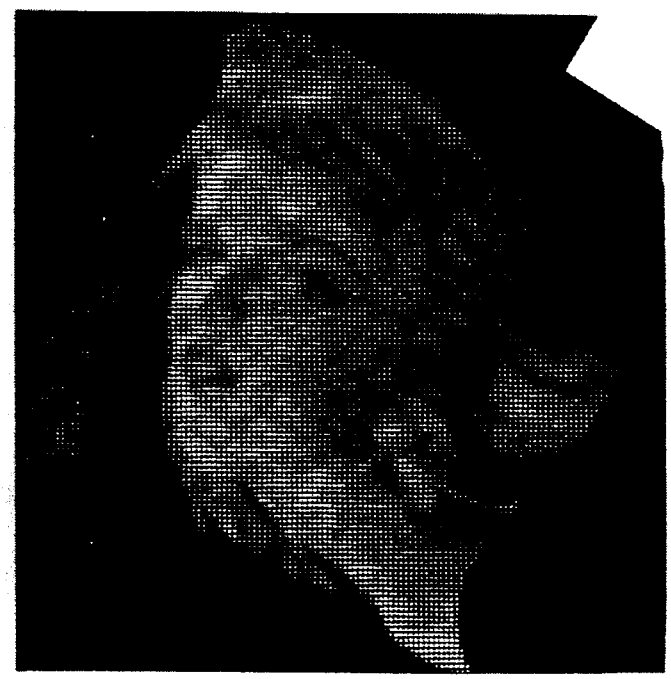
Figure 31C:
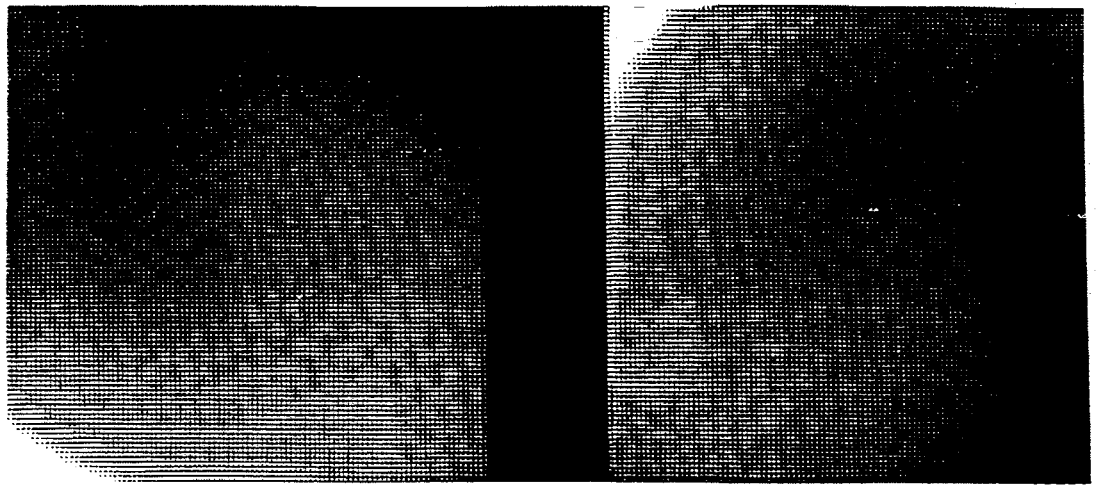
Figure 31D:
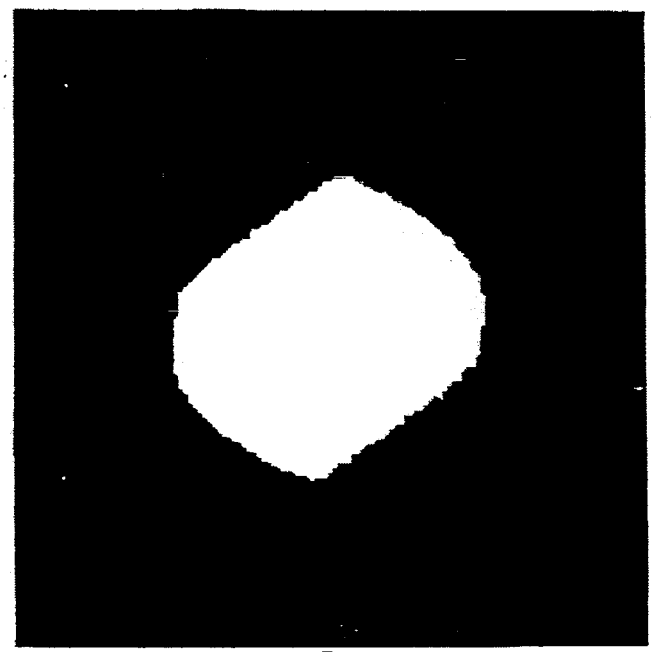

FIG. 31 shows a vortex warp of the checkerboard in FIG. 31(a) and Madonna in FIG. 31(b). XLUT (on left)

and YLUT are shown in FIG. 31(c) and FIG. 31(d) shows S at the output of selector 74 in FIG. 2.

While there have been described what are at present considered to be the preferred embodiments of this invention, it will be obvious to those skilled in the art that various changes and modifications may be made therein without departing from the invention and it is, therefore, intended to cover all changes and variations as fall within the true spirit and scope of the invention.

We claim:

1. An image system including at least one separable image warping system, for transforming input image data to output image data, comprising:

input image value means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

a first channel, for processing input image value data to derive image values representing preliminary values of output image pixels, comprising:

shear resampler means coupled to said x value and y value means and responsive to conditions indicative of shear for processing first and second coordinate data for developing at first and second outputs, respectively, scaled coordinate data representing first and second coordinate values of a magnification of said output image and having a plurality of pixel values in place of each pixel value of the basic output image, and also coupled to said input image value means for similarly processing image data for developing at a third output scaled input image data representing the same magnification of the input image;

x intensity resampler means coupled to said first and third shear resampler outputs for developing intermediate pixel value data representing said scaled input image pixel values after resampling to give effect to image compression variations along the direction of said first coordinate;

coordinate resampler means coupled to said first and second shear resampler outputs for developing at a first output modified second coordinate data representing said scaled second coordinate values after resampling to give effect to image compression variations along the direction of said first coordinate, and for developing at a second output shear data representing a measure of compression variations, along the direction of said first coordinate, in the output image as compared to the input image;

y intensity resampler means coupled to said x intensity resampler means and said first shear resampler output for developing preliminary output pixel value data representing said intermediate pixel values after resampling to give effect to image compression variations along the direction of said second coordinate;

bottleneck resampler means coupled to said first and second coordinate resampler outputs for developing bottleneck image value data representing said shear data after resampling to give effect to image compression variations along the direction of said second coordinate;

transposing means coupled to said input image value, x value and y value means for developing transposed input image, transposed first coordinate and transposed second coordinate data representative of said input and output images respectively after rotation of coordinates of said images to a second alignment;

a second channel, for processing said transposed input image value data in parallel with said first channel to derive image values representing preliminary values of output image pixels of said rotated input image, comprising:

shear resampler means, x intensity resampler means, coordinate resampler means, y intensity resampler means and bottleneck resampler means for respectively providing the same functions as said corresponding elements of said first channel;

comparator means coupled to the bottleneck resampler means of said first and second channels for comparing the respective bottleneck image value data for providing a control signal representative of which of said preliminary output pixel values, as provided at the outputs of said first and second channels, should be selected on a predetermined basis for inclusion in the final output image data for each pixel of the output image; and selector means coupled to the y intensity resamplers of said first and second channels and responsive to said control signal for providing final output image data wherein the value for each pixel represents the value for that pixel from either the first or second channel as selected in response to said control signal.

2. The image system in accordance with claim 1, further comprising:

means for providing first input color image component values;

means for providing second input color image component values;

means for providing third input color image component values;

first said at least one separable image warping system including, second and third warping systems, each coupled to means for providing one of said first, second and third input color image component values; and means for supplying common data to each of said warping systems representing the value of first and second coordinates to which each pixel of a plurality of pixels in said input image is to be transferred in said output image.

3. A transformation channel for use in a separable image warping system for transforming input image data to output image data, comprising:

input image value means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

shear resampler means coupled to said x value means and responsive of conditions indicative of shear for processing first coordinate data for developing at a first output scaled coordinate data representing first coordinate values of a magnification of said output image and having a plurality of pixel values in place of each pixel value of the basic output image, and also coupled to said y value means for processing second coordinate data for developing at a second output scaled second coordinate data having a plurality of pixel values for each pixel value of the basic output image;

x intensity resampler means coupled to said image value means and to said first shear resampler output for developing intermediate pixel value data representing said input image pixel values after resampling to give effect to image compression variations along the direction of said first coordinate;

coordinate resampler means coupled to said first and second shear resampler outputs for developing at a first output modified second coordinate data representing said scaled second coordinate values after resampling to give effect to image compression variations along the direction of said first coordinate, and for developing at a second output shear data representing a measure of compression variations, along the direction of said first coordinate, in the output image as compared to the input image;

y intensity resampler means coupled to said x intensity resampler means and said first coordinate resampler output for developing preliminary output pixel value data representing said intermediate pixel values after resampling to give effect to image compression variations along the direction of said second coordinate; and bottleneck resampler means coupled to said first and second coordinate resampler outputs for developing bottleneck image value data representing shear data after resampling to give effect to image compression variations along the discretion of said second coordinate.

4. A separable image warping system for transforming input image data to output image data, comprising:

input image means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

a first channel, for processing input image value data to derive image values representing preliminary values of output image pixels, comprising:

intensity resampler means coupled to said image value means and to said x value and y value means for providing a two-pass transformation for developing preliminary output pixel values representing said input image pixel values after successive resampling to give effect to image compression variations along the direction of said first and second coordinates; and bottleneck resampler means coupled to said x value and y value means for resampling coordinate data for developing bottleneck image value data indicative of individual pixels in said preliminary output pixel data that have been subjected to positive compression variations exceeding a predetermined measure;

transposing means coupled to said input image value, x value and y value means for developing transposed input image, transposed first coordinate and transposed second coordinate data representative of said input and output images respectively after rotation of coordinates of said images to a second orientation;

a second channel, for processing said transposed input image value data in parallel with said first channel to derive image values representing preliminary values of output image pixels of said rotated input image, comprising:

intensity resampler means and bottleneck resampler means for providing the same functions as said corresponding elements of said first channel;

comparator means coupled to the bottleneck resampler means of said first and second channels for comparing the respective bottleneck image value data for providing a control signal representative of which of said preliminary output pixel values, as developed in said first and second channels, should be selected on a predetermined basis for inclusion in the final output image data, for each pixel of the output image; and selector means coupled to the intensity resampler means of said first and second channels and responsive to said control signal for providing final output image data wherein the value for each pixel represents the value for that pixel from either the first or second channel as selected in response to said control signal.

5. A transformation channel for use in a separable image warping system for transforming input image data to output image data, comprising:

input image means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

a first channel, for processing input image value data to derive image values representing preliminary values of output image pixels, comprising:

intensity resampler means coupled to said image value means and to said x value and y value means for providing two-pass transformation for developing preliminary output pixel values representing said input image pixel values after successive resampling to give effect to image compression variations along the direction of said first and second coordinates; and bottleneck resampler means coupled to said first x value and y value means for resampling coordinate data for developing bottleneck image value data indicative of individual pixels in said preliminary output pixel data that have been subjected to positive compression variations exceeding a predetermined measure.

6. A two-pass transformation system for use in a separable image warping system, for transforming input image data to output image data, comprising:

input image means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

x intensity resampler means coupled to said image value means and to said x value means for developing intermediate pixel value data representing said input image pixel values after resampling to give effect to image compression variations along the direction of said first coordinate;

coordinate resampler means coupled to said x value and y value means for developing modified second coordinate data representing second coordinate values after resampling to give effect to image compression variations along the direction of said first coordinate; and y intensity resampler means coupled to said x intensity resampler means and said coordinate resampler means for developing output pixel value data representing said intermediate pixel values after resampling to give effect to image compression variations along the direction of said second coordinate.

7. A shear data processor for a separable image warping system, for transforming input image data to output image data, comprising:

input image value means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

shear resampler means coupled to said x value and y value means and responsive to conditions indicative of shear, for processing first and second coordinate data to develop, at respective first and second outputs, scaled coordinate data representing first and second coordinate values of a magnification of a basic output image, having a plurality of pixel values in place of each pixel value of the basic output image;

and, also coupled to said input image value means, means for processing image data in correspondence with the processing of the coordinate data, to develop, at a third output, output image data representing the same magnification of the basic output image.

8. A bottleneck data processor for a separable image warping system, for transforming input image data to output image data, comprising:

x value means for supplying data representing the value of a first coordinate to which each pixel of an input image is to be transferred in an output image;

y value means for supplying data representing the value of a second coordinate to which each said pixel is to be transferred in said output image;

coordinate resampler means coupled to said x value and y value means for developing at a first output modified second coordinate data representing said second coordinate values after resampling to give effect to image compression variations along the direction of said first coordinate, and for developing at a second output shear data representing a measure of compression variations, along the direction of said first coordinate, in the output image as compared to the input image; and bottleneck resampler means coupled to said first and second coordinate resampler outputs for developing bottleneck image value data representing said shear data after resampling to give effect to image compression variations along the direction of said second coordinate.

9. A separable image warping system, for transforming input image data to output image data, comprising:

input image means for supplying luminance data each pixel of a plurality of pixels in a two-dimensional image;

x value means for supplying XLUT data;

y value means for supplying YLUT data;

a first channel, for processing luminance data to derive image values representing preliminary values of output image pixels, comprising:

shear resampler means coupled to said x value and y value means for processing XLUT data for developing at a first output scaled XLUT data representing XLUT of a magnification of said output image and having a plurality of pixel values in place of each pixel value of the basic output image, and for processing XLUT data for developing at a second output scaled second coordinate data having a plurality of pixel values for each pixel value of the basic output image;

x intensity resampler means coupled to said input image means and to said first shear resampler output for developing intermediate luminance data representing said input luminance data after resampling to give effect to image compression variations along the x direction;

coordinate resampler means coupled to said first and second shear resampler outputs for developing at a first output modified YLUT data representing said scaled YLUT after resampling to give effect to image compression variations along the x direction, and for developing at a second output shear data representing a measure of compression variations along the direction of said first coordinate, in the output image as compared to the input image;

y intensity resampler means coupled to said x intensity resampler means, said first shear resampler output and a first z channel for developing preliminary luminance data representing said intermediate luminance data after resampling to give effect to image compression variations along the y direction;

bottleneck resampler means coupled to said first and second coordinater resample outputs for developing bottleneck image value data representing said shear data after resampling to give effect to image compression variations along the direction of said y coordinate;

transposing means coupled to said input image, x value and y value means for developing transposed input image and transposed XLUT and YLUT data representative of said input and output images respectively after transposing their coordinates to a second orientation;

a second channel, for processing said transposed luminance data in parallel with said first channel to derive data representing preliminary luminance values of output image pixels of said transposed input image, comprising:

shear resampler means, x intensity resampler means, coordinate resampler means, y intensity resampler means and bottleneck resampler means each for providing the same functions as corresponding elements of said first channel;

comparator means coupled to the bottleneck resampler means of said first and second channels for comparing the respective bottleneck image value data for providing a control signal representative of which of said preliminary luminance values, as provided at the outputs of said first and second channels, should be selected on a predetermined basis for inclusion in the final output image data for each pixel of the output image; and selector means coupled to the y intensity resamplers of said first and second channels and responsive to said control signal for providing final output luminance data wherein the luminance value for each pixel represents the luminance for that pixel from either the first or second channel as selected in response to said control signal.

10. An image system including at least one separable image warping system, for transforming input image data to output image data, comprising:

input image value means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

z value means for supplying data representing values of a third coordinate relevant to the transformation of input image data to output image data;

a first channel, for processing input image value data to derive image values representing preliminary values of output image pixels, comprising:

shear resampler means coupled to said x value means and y value means for processing first coordinate data for developing at a first output scaled first coordinate data representing first coordinate values of a magnification of said output image and having a plurality of pixel values in place of each pixel value of the basic output image, and for processing second coordinate data for developing at a second output scaled second coordinate data having a plurality of pixel values for each pixel value of the basic output image;

x intensity resampler means coupled to said input image value means and to said first shear resampler output for developing intermediate pixel value data representing said input image pixel values after resampling to give effect to image compression variations along the direction of said first coordinate;

coordinate resampler means coupled to said first and second shear resampler outputs for developing at a first output modified second coordinate data representing said scaled second coordinate values after resampling to give effect to image compression variations along the direction of said first coordinate, and for developing at a second output shear data representing a measure of compression variations along the direction of said first coordinate, in the output image as compared to the input image;

y intensity resampler means coupled to said x intensity resampler means, said first coordinate resampler output and a first z channel for developing preliminary output pixel value data representing said intermediate pixel values after resampling to give effect to image compression variations along the direction of said second coordinate;

bottleneck resampler means coupled to said first and second coordinate resample outputs for developing bottleneck image value data representing said shear data after resampling to give effect to image compression variations along the direction of said second coordinate;

a first z channel, for processing third coordinate values, comprising:

terminal means for supplying scaled first coordinate data as developed at said first shear resampler output of said first channel;

z shear resampler means coupled to said x value, y value and z value means for developing sealed third coordinate data representing third coordinate values of a magnification of said output image and having a plurality of pixel values in place of each pixel value of the basic output image;

z coordinate resampler means coupled to said terminal means and to said z shear resampler means for developing modified third coordinate data representing said scaled third coordinate values after resampling to give effect to image compression variations along the direction of said first coordinate; and means for coupling said modified third coordinate data to the y intensity resampler of said first channel for enabling said resampler to process foldover data for deleting foldover data representative of image portions not visible in the final output image;

transposing means coupled to said input image value, x value, y value and z value means for developing transposed input image, transposed first coordinate, transposed second coordinate and transposed third coordinate data representative of said input and output images respectively after rotation of their coordinates to a second orientation;

a second channel, for processing said transposed input image value data in parallel with said first channel to derive image values representing preliminary values of output image pixels of said rotated input image, comprising:

shear resampler means, x intensity resampler means, coordinate resampler means, y intensity resampler means and bottleneck resampler means for providing the same functions as said corresponding elements of said first channel;

a second z channel, in parallel with said first z channel, for processing transposed third coordinate values, comprising:

terminal means, z shear resampler means and z coordinate resampler means for providing the same functions as the corresponding elements of said first z channel; and means for coupling the resulting modified transposed third coordinate data to the y intensity resampler of said second channel for providing the same function as the corresponding element of said first z channel;

comparator means coupled to the bottleneck resampler means of said first and second channels for comparing the respective bottleneck image value data for providing a control signal representative of which of said preliminary output pixel values, as provided at the outputs of said first and second channels, should be selected on a predetermined basis for inclusion in the final output image data for each pixel of the output image; and selector means coupled to the y intensity resamplers of said first and second channels and responsive to said control signal for providing final output image data wherein the value for each pixel represents the value for that pixel from either the first or second channel as selected in response to said control signal.

11. The image system in accordance with claim 1, further comprising:

means for providing first input color image component values;

means for providing second input color image component values;

means for providing third input color image component values;

first said at least one separable image warping system including second and third warping systems, each coupled to means for providing one of said first, second and third input color image component values; and means for supplying common data to each of said warping systems representing the value of first and second coordinates to which each pixel of a plurality of pixels in said input image is to be transferred in said output image.

12. A separable image warping system, for transforming input image data to output image data, comprising:

input image means for supplying luminance data each pixel of a plurality of pixels in a two-dimensional image;

x value means for supplying XLUT data;

y value means for supplying YLUT data;

z value means for supplying ZLUT data;

a first channel, for processing luminance data to derive image values representing preliminary values of output image pixels, comprising:

shear resampler means coupled to said x value and y value means for processing XLUT data for developing at a first output scaled XLUT data representing XLUT of a magnification of said output image and having a plurality of pixel values in place of each pixel value of the basic output image, and for similarly processing XLUT data for developing at a second output scaled second coordinate data having a plurality of pixel values for each pixel value of the basic output image;

x intensity resampler means coupled to said input image means and to said first shear resampler output for developing intermediate luminance data representing said input luminance data after resampling to give effect to image compression variations along the x direction;

coordinate resampler means coupled to said first and second shear resampler outputs for developing at a first output modified YLUT data representing said scaled YLUT after resampling to give effect to image compression variations along the x direction, and for developing at a second output shear data representing a measure of compression variations along the direction of said first coordinate, in the output image as compared to the input image;

y intensity resampler means coupled to said x intensity resampler means, said first shear resampler output and a first z channel for developing preliminary luminance data representing said intermediate luminance data after resampling to give effect to image compression variations along the y direction;

bottleneck resampler means coupled to said first and second coordinate resampler outputs for developing bottleneck image value data representing said excised y coordinate values after resampling to give effect to image compression variations along the direction of said y coordinate;

a first z channel, for processing ZLUT data, comprising:

terminal means for supplying scaled XLUT data as developed at said first shear resampler output of said first channel;

z shear resampler means coupled to said x value, y value and z value means for developing scaled XLUT data representing XLUT of a magnification of said output image and having a plurality of pixel values in place of each pixel value of the basic output image;

z coordinate resampler means coupled to said terminal means and to said z shear resampler means for developing modified ZLUT data representing said scaled ZLUT after resampling to give effect to image compression variations along the z direction; and means for coupling said modified ZLUT data to the y intensity resampler of said first channel for enabling said resampler to process foldover data for deleting foldover data representative of image portions not visible in the final output image;

transposing means coupled to said input image, x value, y value and z value means for developing transposed input image and transposed XLUT, YLUT and ZLUT data representative of said input and output images respectively after transposing coordinates of said images to a second orientation;

a second channel, for processing said transposed luminance data in parallel with said first channel to similarly derive data representing preliminary luminance values of output image pixels of said transposed input image, comprising:

shear resampler means, x intensity resampler means, coordinate resampler means, y intensity resampler means and bottleneck resampler means each for providing the same functions as corresponding elements of said first channel;

a second z channel, in parallel with said first z channel, for processing transposed ZLUT data, comprising:

terminal means, z shear resampler means and z coordinate resampler means for providing the same functions as the corresponding elements of said first z channel; and means for coupling the resulting modified ZLUT data to the y intensity resampler of said second channel for providing the same function as the corresponding element of said first z channel.

comparator means coupled to the bottleneck resampler means of said first and second channels for comparing the respective bottleneck image value data for providing a control signal representative of which of said preliminary luminance values, as provided at the outputs of said first and second channels, should be selected on a predetermined basis for inclusion in the final output image data for each pixel of the output image; and selector means coupled to the y intensity resamplers of said first and second channels and responsive to said control signal for providing final output luminance data wherein the luminance value for each pixel represents the luminance for that pixel from either the first or second channel as selected in response to said control signal.

13. A separable image warping system, for transforming input image data to output image data, comprising:

input image value means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

z value means for supplying data representing values of a third coordinate relevant to the transformation of input image data to output image data;

x intensity resampler means coupled to said input image value means and to said x value means for developing intermediate pixel value data representing said input image pixel values after resampling to give effect to image compression variations along the direction of said first coordinate;

y intensity resampler means coupled to said x intensity resampler means, said y value means and a z intensity resampler for developing preliminary output pixel value data representing said intermediate pixel values after resampling to give effect to image compression variations along the direction of said second coordinate;

z coordinate resampler means coupled to said x value and z value means for developing modified third coordinate data representing said scaled third coordinate values after resampling to give effect to image compression variations along the direction of said first coordinate; and means for coupling said modified third coordinate data to the y intensity resampler for enabling said resampler to process foldover data for deleting foldover data representative of image portions not visible in the final output image.

14. A method for separably warping input image data, representing an image value for each of a plurality of pixels of an input image, to provide output image data, comprising the steps of:

(a) resampling input image data, in response to output image first coordinate values to adjust for image compression variations along the direction of said first coordinate of an input image, for developing intermediate pixel data;

(b) resampling output image second coordinate values as in step (a), for developing transformed coordinate data representing second coordinate data resampled in response to said first coordinate values;

(c) resampling said intermediate pixel data, in response to transformed coordinate data developed in step (b) to adjust for image compression variations along the direction of a second coordinate, for developing first image data representing preliminary output pixel values;

(d) repeating steps (a), (b) and (c) substituting transposed image data, first coordinate values and second coordinate values for said image data, first coordinate values and second coordinate values, respectively, as referred to in said steps, for developing second image data representing preliminary output pixel values;

(e) determining, for each output image pixel, which pixel value from either step (c) or step (d) to select for use in the output image data; and (f) assembling output image data by selection of values for individual output pixels from steps (c) and (d), according to said step (e) determination.

15. A method for separably warping input image data, representing an image value for each of a plurality of pixels of an input image, to provide output image data, comprising the steps of:

(a) resampling input pixel values in two-passes to successively adjust for image compression variations along the directions of two coordinates of a first orientation of an input image for developing a first output representing preliminary pixel values of an output image;

(b) repeating step (a) substituting transposed input pixel values resampled to adjust for compression variations along the directions for two coordinates of a second orientation of said input image for developing a second such output;

(c) resampling data representing the values of coordinate positions to which pixels of said input image are to be transformed in said output image, for developing a control signal indicative of which pixel value from either step (a) or step (b) to select for use in the output image data; and (d) assembling output image data by selection of values for individual output pixels from steps (a) and (b) in response to said control signal.

16. A method for separably warping input image data, representing an image value for each of a plurality of pixels of an input image, to provide output image data, comprising the steps of:

(a) resampling input image data, in response to output image first coordinate values to adjust for image compression variations along the direction of said first coordinate of an input image, for developing intermediate pixel data;

(b) resampling output image second coordinate values as in step (a), for developing transformed coordinate data representing second coordinate data resampled in response to said first coordinate values;

(c) resampling output image third coordinate values as in step (a), for developing transformed coordinate data representing third coordinate data resampled in response to said first coordinate values;

(d) resampling said intermediate pixel data, in response to transformed coordinate data developed in step (b), to adjust for image compression variations along the direction of a second coordinate and removing pixel values for foldover image portions not visible in the final output image, in response to the transformed third coordinate data developed in step (c), for developing first image data representing preliminary output pixel values;

(e) repeating steps (a), (b), (c) and (d) substituting transposed image data, first coordinate values, second coordinate values, and third coordinate values for said image data, first coordinate values, second coordinate values and third coordinate values, respectively, referred to in said steps (a), (b), (c) and (d), for developing second image data representing preliminary output pixel values;

(f) determining, for each output image pixel, which pixel value from either step (d) or step (e) to select for use in the output image data; and (g) assembling output image data by selection of values for individual output pixels from steps (d) and (e), according to said step (f) determination.

17. A method for separably warping input image data, representing an image value for each of a plurality of pixels of an input image, to provide output image data, comprising the steps of:

(a) resampling input image data, in response to output image first coordinate values to adjust for imae compression variations along the direction of said first coordinate of an input image, for developing intermediate pixel data;

(b) resampling output image second coordinate values as in step (a), for developing transformed coordinate data representing second coordinate data resampled in response to said first coordinate values; and (c) resampling said intermediate pixel data, in response to transformed coordinate data developed in step (b) to adjust for image compression variations along the direction of a second coordinate, for developing first image data representing output pixel values.

18. The method in accordance with claim 14, 15, 16 or 17, wherein the resampling recited is carried out independently with respect to output image first and second coordinate values for each pixel of the output image.

19. The method in accordance with claim 14, 15 or 17, additionally comprising the steps of:

initially developing scaled coordinate data representing first and second coordinates of a magnification of the desired output image, developing scaled input image data representing a corresponding magnification of the input image, and substituting such scaled data for the corresponding unscaled data as called for in the steps of this claim.

20. The method in accordance with claim 16 additionally comprising the step of initially developing scaled coordinate data representing first, second and third coordinates of a magnification of the desired output image, developing scaled input image data representing a corresponding magnification of this input image, and substituting such scaled data for the corresponding unscaled data as called for in the steps of the claim.

21. A bottleneck compensation method for separably warping input image data, representing an image value for each of a plurality of pixels of an input image, to provide output image data, comprising the steps of:

(a) resampling input pixel values in two-passes to successively adjust for image compression variations along the directions of two coordinates of a first orientation of an input image for developing a first output representing preliminary pixel values of an output image, which pixel values may have been distorted in said successive resampling;

(b) repeating step (a) substituting transposed input pixel values resampled to adjust for compression variations along the directions for two coordinates of a second orientation of said input image for developing a second such output, including pixel values which may have been distorted in said successive resampling; and (c) assembling output image data by selection of values for individual output pixels from steps (a) and (b), wherein the value for each pixel represents the value for that pixel selected in preference to pixel values subject to relatively higher distortion.

22. A method for warping input image data, representing an image value for each of a plurality of pixels of an input image, to provide output image data, comprising the steps of:

(a) resampling output image second coordinate values, in response to output image first coordinate values to adjust for image compression variations along the direction of said first coordinate of an input image, for developing transformed coordinate data representing second coordinate data resampled in response to said first coordinate values; and (b) resampling said image pixel data, in response to transformed coordinate data developed in step (a) to adjust for image compression variations along the direction of a second coordinate, for developing image data representing output pixel values.

23. A method for warping input image data, representing an image value for each of a plurality of pixels of an input image, to provide output image data, comprising the steps of:

(a) resampling input image data, in response to output image first coordinate values to adjust for image compression variations along the direction of said first coordinate of an input image, for developing intermediate pixel data;

(b) resampling output image second coordinate values as in step (a), for developing transformed coordinate data representing second coordinate data resampled in response to said first coordinate values;

(c) resampling output image third coordinate values as in step (a), for developing transformed coordinate data representing third coordinate data resampled in response to said first coordinate values; and (d) resampling said intermediate pixel data, in response to transformed coordinate data developed in step (b), to adjust for image compression variations along the direction of a second coordinate and removing pixel values for foldover image portions not visible in the final output image, in response to the transformed third coordinate data developed in step (c), for developing image data representing preliminary output pixel values.

24. A resampler system for use in a separable image warping system, for transforming input image data to output image data, comprising:

input image means for supplying data representing an image value for each pixel of a plurality of pixels in a two-dimensional image;

x value means for supplying data representing the value of a first coordinate to which each said pixel is to be transferred in an output image;

x intensity resampler means coupled to said image value means and to said x value means for developing intermediate pixel value data representing said input image pixel values after resampling to give effect to image compression variations along the direction of said first coordinate, and for developing a plurality of intermediate values for individual pixels subject to foldover, representing visible and hidden pixel values; and y intensity resampler means coupled to said x intensity resampler means for developing output pixel value data representing said intermediate pixel values after resampling to give effect to image compression variations along the direction of said second coordinate.

25. A resampler system for use in a separable image warping system, for transforming input image data to output image data, comprising:

input image means for supplying data representing an image value for each pixel of a plurality of pixels in a two-dimensional image;

x value means for supplying data representing the value of a first coordinate to which each said pixel is to be transferred in an output image;

y value means for supplying data representing the value of a second coordinate to which each said pixel is to be transferred in said output image;

coordinate resampler means coupled to said x value and y value means for developing modified second coordinate data representing second coordinate values after resampling to give effect to image compression variations along the direction is said first coordinate; and y intensity resampler means coupled to said coordinate resampler means and said image value means for developing output pixel value data representing input image pixel values after resampling to give effect to image compression variations along the direction of said second coordinate.

26. A bottleneck compensation system for an image warping system for transforming input image data to output image data, comprising:

first channel means for providing preliminary output pixel values representing input pixel values after successive resampling along the direction of first and second coordinates to give effect to image compression variations, which pixel values may have been distorted in said successive resampling;

second channel means for providing preliminary output pixel values representing said input image pixel values after successive resampling effectively along the direction of third and fourth coordinates to give effect to image compression variations, which pixel values may have been distorted in said successive resampling; and selector means coupled to said first and second channel means for providing final output image data wherein the value for each pixel represents the value for that pixel selected from either the first or second channel means to provide final output image pixel values selected in preference to pixel values subject to relatively higher distortion.

27. A bottleneck compensation system as in claim 26, in which the effective resampling along third and fourth coordinates in the second channel means is accomplished by the resampling along said first and second coordinates of input image data that has been transposed by rotation of the coordinates of the input image to a second orientation.

28. A method for resampling input image data, representing an image value for each of a plurality of pixels of an input image, in response to output image coordinate values to adjust for image compression variations along the direction of the same coordinate of the input image, comprising the steps of:

(a) determining whether the next input pixel portion of input data fits within the boundaries of an output pixel, along the direction of said coordinate;

(b) determining, for an input pixel portion that so fits as determined in step (a), the midpoint value of said pixel portion, along said direction;

(c) deriving the area of said input pixel portion by multiplying the midpoint value from step (b) by a figure representative of the length of said pixel portion, along said direction;

(d) determining, for an input pixel portion that does not so fit as determined in step (a), the part of the input pixel portion that fits within said output pixel, along said direction;

(e) determining the midpoint value of the input pixel part determined in step (d), along said direction;

(f) deriving the area of said input pixel part by multiplying the midpoint value from step (e) by a figure representative of the length of said pixel part, along said direction;

(g) accumulating the areas determined in steps (c) and (f) to obtain the resamples value for a complete output pixel; and (h) repeating the foregoing steps to resample additional input image data to provide output image pixel value data.

29. A method for resampling input image data successively to adjust for image compression variations along two coordinates, comprising: applying the steps of claim 28 first with respect to the direction of a first coordinate and repeating said steps with respect to the direction of a second coordinate, whereby said input image data is successively resampled in two coordinate directions.

30. A method for resampling input image data as in claim 29, in which said two coordinates are orthogonal.

31. A method for resampling input image data as in claim 28 or 29, in which the image value of the input image which is resampled is the intensity value of input pixels.

32. A method for resampling input image data as in claim 28 or 29, in which the image value of the input image which is resampled is a color value of the input pixels.

33. A method for resampling second coordinate data, representing values of a second coordinate to which each pixel of an input image is to be transferred in an output image, in response to first coordinate values to adjust for image compression variations along the direction of said first coordinate, comprising the steps of:

(a) determining whether the next input pixel portion of input data fits within the boundaries of an output pixel, along the direction of said coordinate;

(b) determining, for an input pixel portion that so fits as determined in step (a), the midpoint value of said pixel portion, along said direction;

(c) determining, for an input pixel protion that does not so fit as determined in step (a), the part of the input pixel portion that fits within said output pixel along said direction;

(d) determining the midpoint value of the input pixel part determined in step (c), along said direction; and (e) accumulating the midpoint value information from steps (b) and (d) as resampled second coordinate value data for the respective pixels, reflecting effects of image compression variations in the first coordinate direction.

34. A resampler for developing pixel value data representing input image pixel values after resampling to give effect to image compression variations along the direction of a first coordinate, comprising:

first means for determining whether the next input pixel portion in input data fits within the boundaries of an output pixel, along the direction of said first coordinate, and for input pixel portions that do not so fit, for determining the part of the input pixel portion that does fit within said output pixel, along said direction;

first multiplication means coupled to said first means and responsive to input pixel portions that so fit, for determining the midpoint value of said pixel portion, along said direction, and for deriving the area of said input pixel portion by multiplying said midpoint value by a figure representative of the length of said pixel portion, along said direction;

second multiplication means, coupled to said first means, for determining the midpoint value of said pixel part, along said direction, and for deriving the area of said input pixel part by multiplying said midpoint value by a figure representative of the length of said pixel part, along said direction; and accumulation means, coupled to said first and second multiplication means, for accumulating the derived areas to obtain resampled values for complete output pixels;

whereby pixel values input to the resampler are resampled to provide at the output pixel values reflecting image compression values in said first coordinate direction.

35. An image system including at least one resampler for developing pixel value data representing image pixel values after resampling to give effect to image compression variations along the direction of a first coordinate, comprising:

first means for determining whether the next input pixel portion in input data fits within the boundaries of an output pixel, along the direction of said first coordinate;

second means coupled to said first means and responsive to input pixel portions that so fit, for determining the midpoint value of said pixel portion, along said direction;

first multiplication means, coupled to said second means, for deriving the area of said input pixel portion by multiplying said pixel portion midpoint value by a figure representative of the length of said pixel portion, along said direction;

third means, coupled to said first means and responsive to input pixel portions that do not so fit, for determining the part of the input pixel portion that does fit within said output pixel, along said direction;

fourth means, coupled to said third means, for determining the midpoint value of said pixel part, along said direction;

second multiplication means, coupled to said fourth means, for deriving the area of said input pixel part by multiplying said pixel part midpoint value by a figure representative of the length of said pixel part, along said direction; and accumulation means, coupled to said first and second multiplication means, for accumulating the derived areas to obtain resampled values for complete output pixels;

whereby pixel values input to the resampler are resampled to provide at the output pixel values reflecting image compression values in said first coordinate direction.

36. A resampler for giving effect to image compression variations along the direction of a second coordinate, comprising a resampler as in claim 34 or 35 wherein the respective means are arranged for developing pixel value data representing input image pixel values after resampling to give effect to image compression variations along the direction of a second coordinate;

whereby said resampler may be arranged in series with a resampler in accordance with claim 34 or 35 to comprise an image warping system for successively resampling an input image in two coordinates.

37. The image system in accordance with claim 35, in which said at least one resampler comprising:

a first resampler and a second resampler, coupled to said first resampler, wherein the respective means are arranged for developing pixel value data representing input image pixel values from said first resampler after second resampling to give effect to image compression variations along the direction of a second coordinate.

38. A coordinate resampler for developing coordinate value data representing second coordinate data, for the transfer of input pixel data to output pixel data, after resampling to give effect to image compression variations along the direction of a first coordinate, comprising:

first means for determining whether the next input pixel portion of input data fits within the boundaries of an output pixel, along the direction of said first coordinate;

second means coupled to said first means and responsive to input pixel portions that so fit, for determining the midpoint value of said pixel portion, along said direction;

third means, coupled to said first means and responsive to input pixel portions that do not so fit, for determining the part of the input pixel portion that does fit within said output pixel, along said direction;

fourth means coupled to said third means, for determining the midpoint value of said pixel part, along said direction; and accumulation means coupled to said second and fourth means and responsive to said midpoint values, for providing resampled second coordinate value data for the respective pixels, reflecting effects of image compression variations in said first coordinate direction.

* * * * *

UNITED STATES PATENT AND TRADEMARK OFFICE
CERTIFICATE OF CORRECTION

PATENT NO. : 5,204,944

DATED : April 20, 1993

INVENTOR(S) : George Wolberg et al.

It is certified that error appears in the above-identified patent and that said Letters Patent is hereby corrected as shown below:

On title page, Item 56, first line under "OTHER PUBLICATIONS," "Cutmull" should read -- Catmull --. Col. 5, line 13, "refers" should read -- refers to the --. Col. 10, line 16, "illustrates" should read -- illustrate --; line 17, "quadulaterals" should read -- quadrilaterals --. Col. 15, line 57, "each" should read -- each of --. Col. 16, line 1, "register" should read -- registers --. Col. 17, line 1, "to be to" should read -- to be --. Col. 18, line 31, "as in" should read -- as an --. Col. 22, line 23, "jaggedess" should read -- jaggedness --. Col. 24, line 13, "not" should read -- $\underline{not}$ --; line 28, "$BT^T_{xy}$ should read -- $B^T_{xy}$ --. Col. 25, line 46, "the" should read -- The --. Col. 26, line 33, second occurrence, "the" should read -- The --. Col. 27, line 9, "indx" should read -- index --. Col. 31, line 6, "more that" should read -- more than --; line 39, "develop 15" should read -- develop --. Col. 32, line 7, "which" should read -- which of --. Col. 34, line 14, "from T" should read -- from --; lines 38-39, "jaggedess" should read -- jaggedness --. Col. 35, line 36, delete "similarly".

UNITED STATES PATENT AND TRADEMARK OFFICE
CERTIFICATE OF CORRECTION

PATENT NO. : 5,204,944
DATED : April 20, 1993
INVENTOR(S) : George Wolberg et al.

It is certified that error appears in the above-identified patent and that said Letters Patent is hereby corrected as shown below:

Col. 36, line 43, "first said" should read -- said --; line 44, "including" should read -- including first; line 66, "responsive of" should read -- responsive to --. Col. 40, line 9, "each" should read -- to each --. Col. 43, line 25, "first said" should read -- said --; line 26, "including" should read -- including first; line 37, "data" should read -- data to --. Col. 44, line 44, "nput" should read -- input --; line 50, "similarly derive" should read -- derive --. Col. 47, line 22, "imae" should read -- image --. Col. 49, line 33, "direction is" should read -- direction of --. Col. 50, line 30, "resamples" should read -- resampled --. Col. 52, line 30, "comprising" should read -- comprises --.

Signed and Sealed this

Eighteenth Day of October, 1994

Attest:

BRUCE LEHMAN

*Attesting Officer*     *Commissioner of Patents and Trademarks*